United States Patent
Noutomi

(10) Patent No.: US 9,542,019 B2
(45) Date of Patent: Jan. 10, 2017

(54) DEVICE, METHOD, AND STORAGE MEDIUM STORING PROGRAM FOR DISPLAYING OVERLAPPED SCREENS WHILE PERFORMING MULTITASKING FUNCTION

(71) Applicant: KYOCERA CORPORATION, Kyoto-shi, Kyoto (JP)

(72) Inventor: Masahiro Noutomi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 567 days.

(21) Appl. No.: 13/686,100

(22) Filed: Nov. 27, 2012

(65) Prior Publication Data
US 2013/0135235 A1    May 30, 2013

(30) Foreign Application Priority Data
Nov. 28, 2011   (JP) ................................ 2011-259500

(51) Int. Cl.
| | |
|---|---|
| G06F 3/00 | (2006.01) |
| G06F 3/041 | (2006.01) |
| G06F 3/0488 | (2013.01) |
| G09G 5/14 | (2006.01) |
| G06F 3/01 | (2006.01) |

(52) U.S. Cl.
CPC ............ *G06F 3/041* (2013.01); *G06F 3/0488* (2013.01); *G09G 5/14* (2013.01); *G09G 2340/10* (2013.01)

(58) Field of Classification Search
None
See application file for complete search history.

(56) References Cited

U.S. PATENT DOCUMENTS

| | | | | |
|---|---|---|---|---|
| 6,137,468 | A * | 10/2000 | Martinez et al. | 345/649 |
| 8,082,008 | B2 * | 12/2011 | Hoffman et al. | 455/566 |
| 8,583,915 | B1 * | 11/2013 | Huang | 713/155 |
| 8,775,963 | B2 * | 7/2014 | Mujkic | 715/772 |
| 8,805,450 | B2 * | 8/2014 | Wen et al. | 455/566 |
| 2004/0268263 | A1 * | 12/2004 | Van Dok et al. | 715/733 |
| 2005/0090234 | A1 * | 4/2005 | Ioku | H04M 3/465 |
| | | | | 455/412.2 |
| 2006/0031782 | A1 * | 2/2006 | Houmura et al. | 715/808 |
| 2008/0165160 | A1 | 7/2008 | Kocienda et al. | |
| 2008/0168379 | A1 * | 7/2008 | Forstall | G06F 3/04883 |
| | | | | 715/778 |

(Continued)

FOREIGN PATENT DOCUMENTS

| | | |
|---|---|---|
| JP | 2007-334747 A | 12/2007 |
| WO | 2008086302 A1 | 7/2008 |

OTHER PUBLICATIONS

Office Action mailed Feb. 24, 2015, corresponding to Japanese patent application No. 2011-259500, for which and explanation of relevance is attached.

*Primary Examiner* — Toan Vu
(74) *Attorney, Agent, or Firm* — Hauptman Ham, LLP

(57) ABSTRACT

According to an aspect, a device includes a display and a controller. The display displays a screen. In a case where an execution screen of a second function is to be displayed during execution of a first function, the controller displays the execution screen of the second function and a notification screen indicating that the first function is in the middle of execution on the display in an overlapping manner.

20 Claims, 25 Drawing Sheets

(56) References Cited

U.S. PATENT DOCUMENTS

| | | | |
|---|---|---|---|
| 2009/0160802 A1* | 6/2009 | Yasumi | G06F 3/04883 345/173 |
| 2009/0197621 A1* | 8/2009 | Book | 455/457 |
| 2009/0247112 A1* | 10/2009 | Lundy et al. | 455/404.1 |
| 2009/0305745 A1* | 12/2009 | Satoh et al. | 455/567 |
| 2010/0146437 A1* | 6/2010 | Woodcock et al. | 715/806 |
| 2010/0216442 A1* | 8/2010 | Kim | 455/415 |
| 2010/0262928 A1* | 10/2010 | Abbott | 715/769 |
| 2011/0088086 A1* | 4/2011 | Swink et al. | 726/7 |
| 2011/0115728 A1* | 5/2011 | Kwak et al. | 345/173 |
| 2011/0167383 A1* | 7/2011 | Schuller et al. | 715/808 |
| 2012/0019562 A1* | 1/2012 | Park et al. | 345/657 |
| 2012/0092438 A1* | 4/2012 | Guzman Suarez et al. | 348/14.03 |
| 2012/0150970 A1* | 6/2012 | Peterson et al. | 709/206 |
| 2012/0210273 A1* | 8/2012 | Seong et al. | 715/790 |
| 2012/0220264 A1* | 8/2012 | Kawabata | 455/411 |
| 2012/0311473 A1* | 12/2012 | Nolterieke et al. | 715/768 |
| 2012/0319985 A1* | 12/2012 | Moore | G06F 3/04817 345/173 |
| 2013/0007665 A1* | 1/2013 | Chaudhri et al. | 715/830 |
| 2013/0124276 A1* | 5/2013 | Brown | 705/14.4 |
| 2014/0237378 A1* | 8/2014 | Gonen et al. | 715/745 |

\* cited by examiner

FIG.26

| PROCESSING FUNCTION (PROGRAM) | TRANSPARENCY SETTING | |
|---|---|---|
| | ON | OFF |
| PROGRAM FOR PHONE CALL | ☑ | ☐ |
| WEB BROWER | ☑ | ☐ |
| ... | ☐ | ☑ |
| ... | ☐ | ☑ |
| ... | ☐ | ☑ |
| ... | ☐ | ☑ |
| ... | ☐ | ☑ |
| ... | ☐ | ☑ |
| ... | ☐ | ☑ |
| ... | ☐ | ☑ |
| ... | ☐ | ☑ |

TRANSPARENCY SETTING SCREEN

DEVICE, METHOD, AND STORAGE MEDIUM STORING PROGRAM FOR DISPLAYING OVERLAPPED SCREENS WHILE PERFORMING MULTITASKING FUNCTION

CROSS-REFERENCE TO RELATED APPLICATIONS

This application claims priority from Japanese Application No. 2011-259500, filed on Nov. 28, 2011, the content of which is incorporated by reference herein in its entirety.

BACKGROUND

1. Technical Field

The present application relates to a device, a method, and a storage medium storing therein a program. More particularly, the present application relates to a device including a touch screen display, a method of controlling the device, and a storage medium storing therein a program for controlling the device.

2. Description of the Related Art

A touch screen device having a touch screen display has been known. Examples of the touch screen devices include, but are not limited to, a smartphone and a tablet. The touch screen device detects a gesture of a finger, a pen, or a stylus pen through the touch screen display. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

While most of touch screen devices can perform a plurality of applications of a phone call function and the like in a parallel manner utilizing a multitasking function, there are cases where an application that is not used is left alone in an executing state due to user's negligence or the like. For example, after the end of a conversation with a calling opponent, there is a case where the phone call state is left behind so as to be maintained without receiving an operation of ending the phone call function.

Generally, in a case where a plurality of applications are performed in a parallel manner utilizing a multitasking function, the load of information processing resources such as a CPU and a memory that are mounted in a device increases in accordance with an increase in the number of applications that are performed in a parallel manner, whereby the performance of the device may be lowered.

Meanwhile, in a case where the plurality of applications are performed in a parallel manner, many of devices capable of performing a plurality of applications in a parallel manner displays only an unobtrusive display or the like is made using a small icon, a balloon, or the like for each of applications other than an application that is currently operated by a user. Thus, a display having an appearance that can be easily recognized by a user or the like is not necessarily made. Accordingly, the state in which the performance of the device is lowered may continue, and there may also be a negative effect that the device that is in the state of having lowered performance is used by the user not knowing the state.

For such reasons, there is a need for a device, a method, and a program capable of reducing the possibility that a function that is not used is left behind in the executing state.

SUMMARY

According to an aspect, a device includes a display and a controller. The display displays a screen. In a case where an execution screen of a second function is to be displayed during execution of a first function, the controller displays the execution screen of the second function and a notification screen indicating that the first function is in the middle of execution on the display in an overlapping manner.

According to another aspect, a method is for controlling a device that includes a display. The method includes: determining whether a first function is in the middle of execution; and displaying, in a case where an execution screen of a second function is to be displayed during execution of the first function, the execution screen of the second function and a notification screen indicating that the first function is in the middle of execution on the display in an overlapping manner.

According to another aspect, a non-transitory storage medium stores a program. When executed by a device including a display, the program causes the device to execute: determining whether a first function is in the middle of execution; and displaying, in a case where an execution screen of a second function is to be displayed during execution of the first function, the execution screen of the second function and a notification screen indicating that the first function is in the middle of execution on the display in an overlapping manner.

BRIEF DESCRIPTION OF THE DRAWINGS

FIG. 26 is a diagram illustrating an example of a transparency setting screen.

DETAILED DESCRIPTION

Exemplary embodiments of the present invention will be explained in detail below with reference to the accompanying drawings. A smartphone will be explained below as an example of a device that performs a plurality of applications in a parallel manner utilizing a multitasking function.

Figure 1:
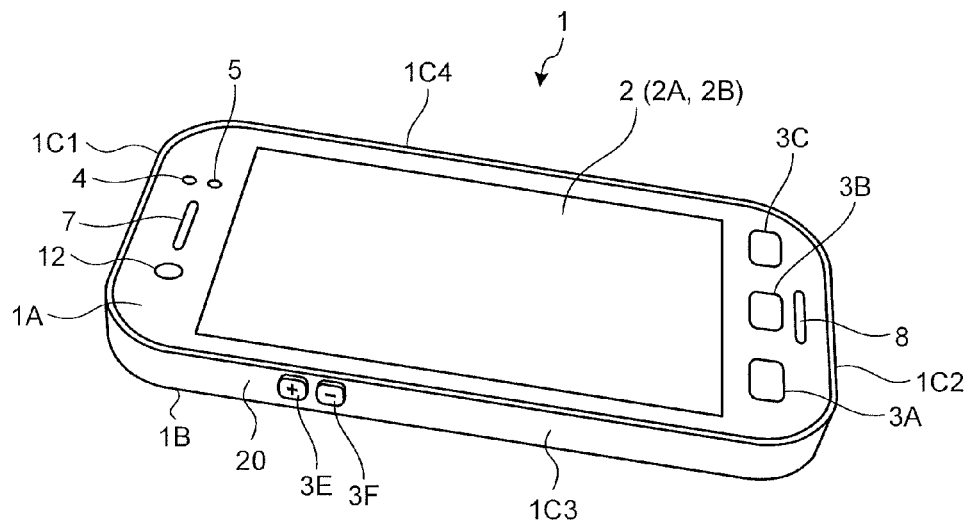
FIG. 1 is a perspective view of a smartphone according to an embodiment.
Figure 2:
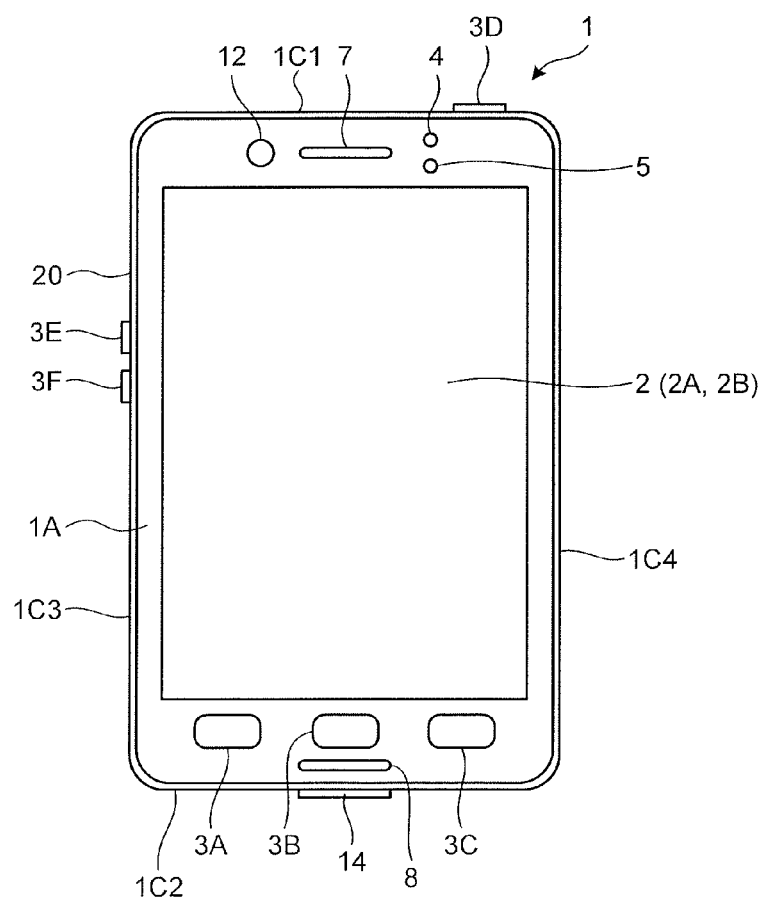
FIG. 2 is a front view of the smartphone.
Figure 3:
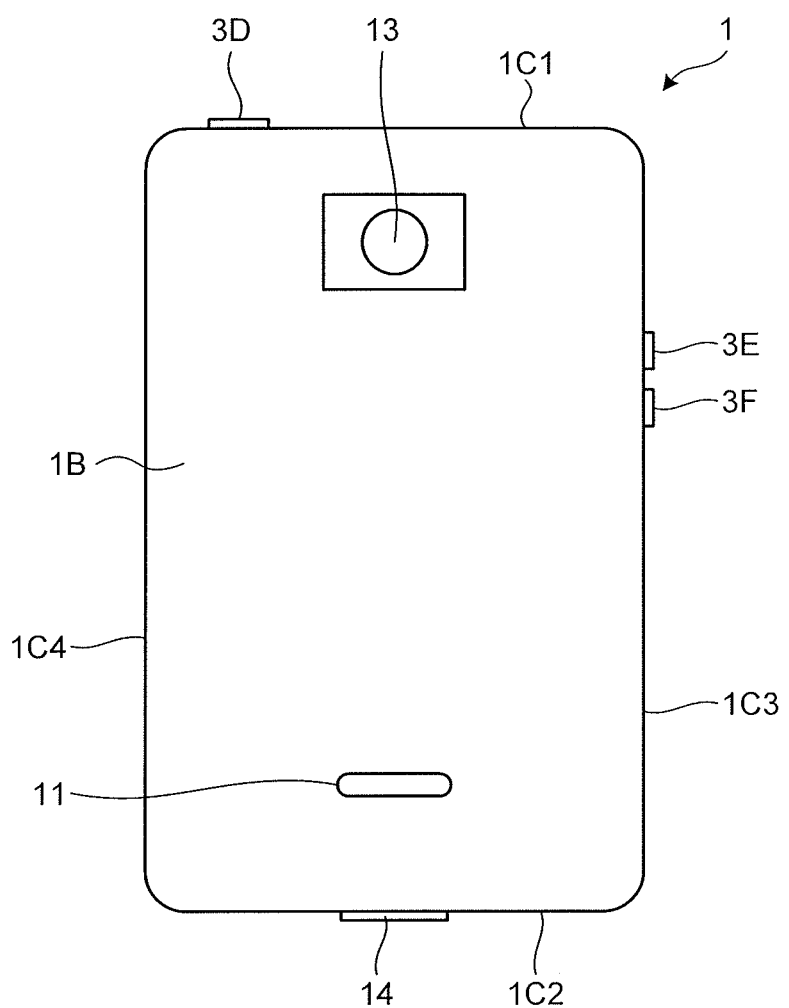
FIG. 3 is a rear view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (OELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, pen, stylus pen, and the like may be referred to as a "contact object" or an "object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

Figure 4:
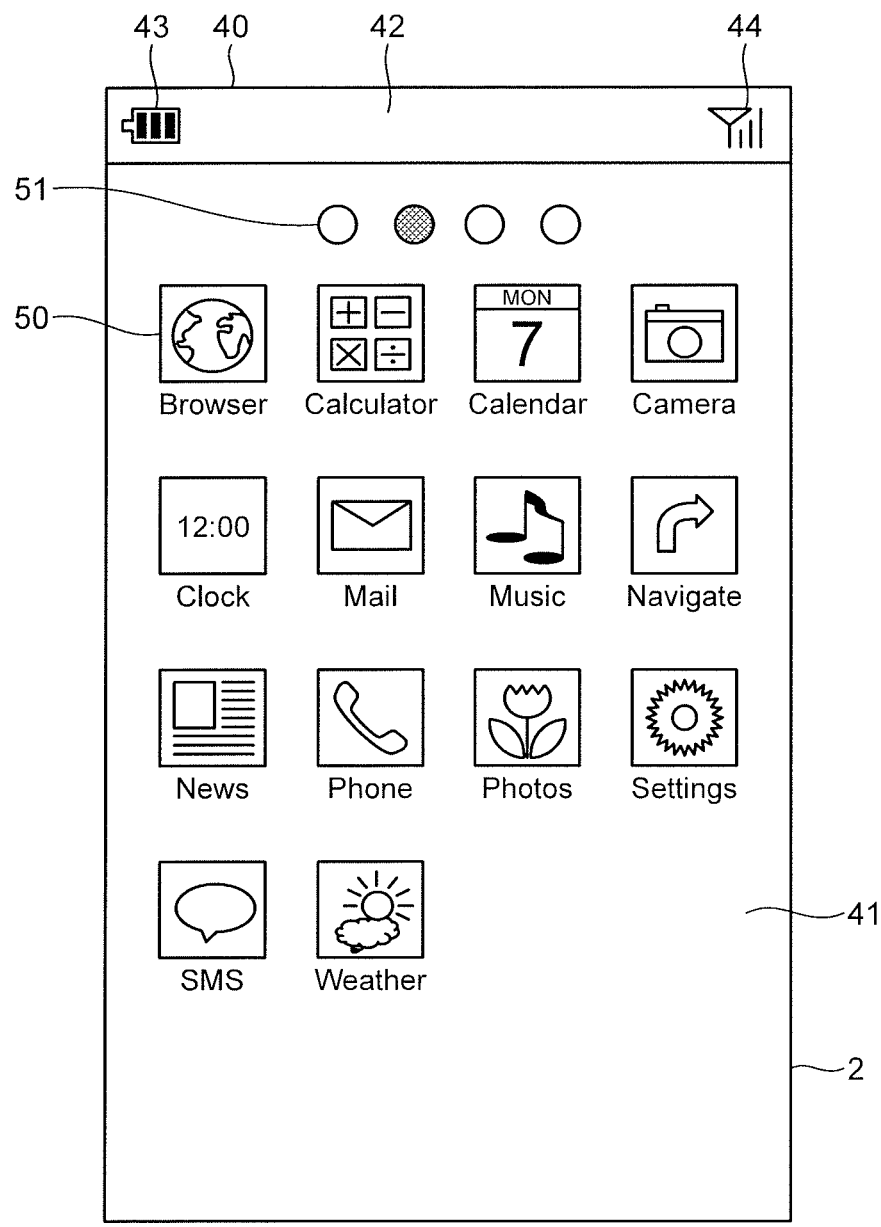
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
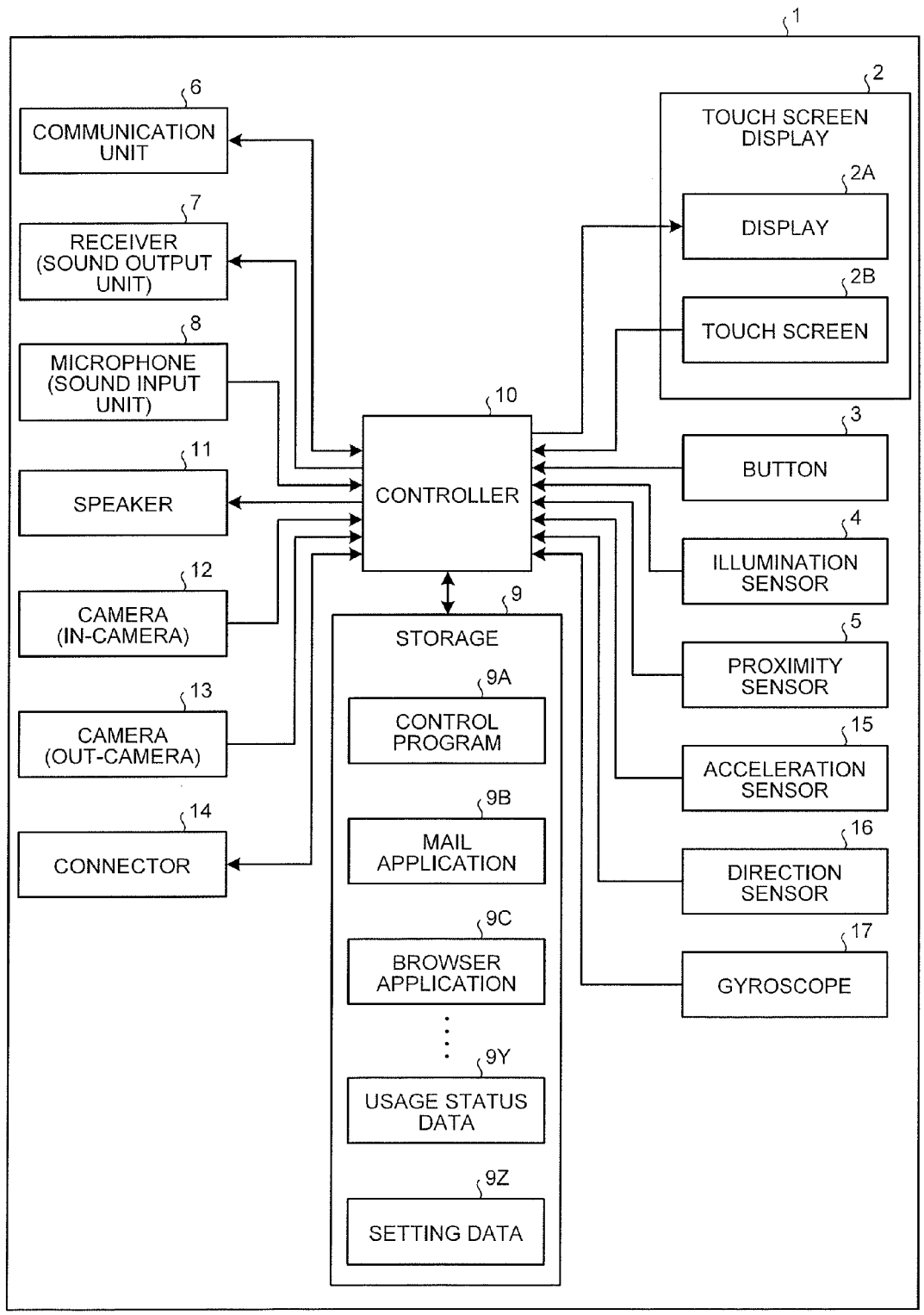
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9, for example, stores a control program 9A, a mail application 9B, a browser application 9C, usage status data 9Y, and setting data 9Z. The mail application 9B provides an electronic mail function. The electronic mail function, for example, enables composition, transmission, reception, and display of an electronic mail. The browser application 9C provides a Web browsing function. The Web browsing function, for example, enables a display of a web page, editing of a book mark, and the like. The usage status data 9Y includes information that relates to a usage status of applications that are installed to the smartphone 1. The setting data 9Z includes information that relates to various settings relating to the operation of the smartphone 1.

The control program 9A provides a function related to various controls for operating the smartphone 1. The control program 9A controls, for example, the communication unit 6, the receiver 7, and the microphone 8 to make a phone call. The function provided by the control program 9A includes functions for performing various controls such as changing information displayed on the display 2A according to an application in execution. The functions provided by the control program 9A can be used in combination with a function provided by the other program such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to thereby execute various controls such as changing information displayed on the display 2A according to an application in execution.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

An example of a control process that is based on the functions provided by the control program 9A will be described with reference to FIGS. 6 to 22. In the functions provided by the control program 9A, a function of displaying a notification screen used for notifying a user of the ongoing execution of a first function so as to overlap an execution screen that is executed by a second function other than the first function in a case where the execution screen is displayed during the execution of the first function is included. For example, in the functions provided by the control program 9A, a function of displaying an image displayed on the screen used for notifying a user of the ongoing execution of a predetermined application and an image displayed on a screen that is executed by another application other than the predetermined application on the display 2A in an overlapping manner is included. Hereinafter, a plurality of examples of displaying an image displayed on the screen used for notifying a user of the ongoing execution of a predetermined application and an image displayed on a screen that is executed by another application other than the predetermined application on the display 2A in an overlapping manner will be illustrated.

Figure 6:
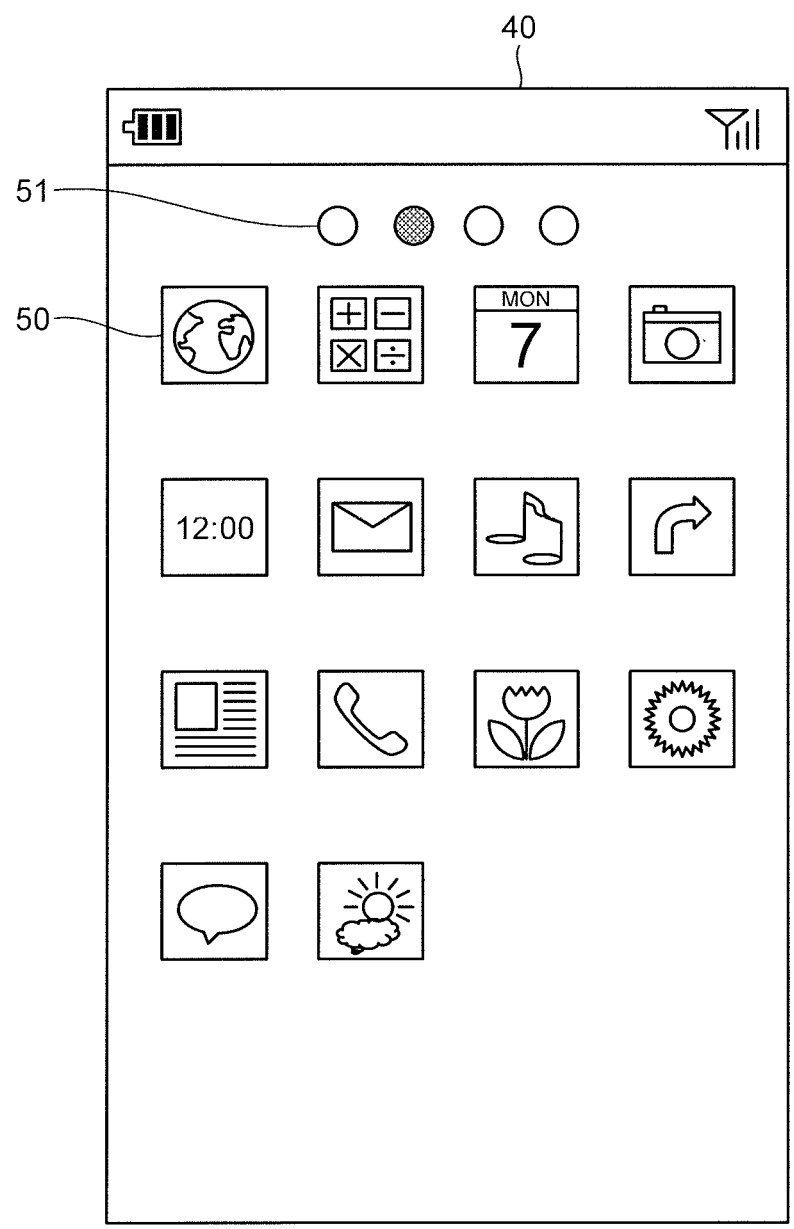
FIG. 6 is a schematic diagram of the home screen.
Figure 7:
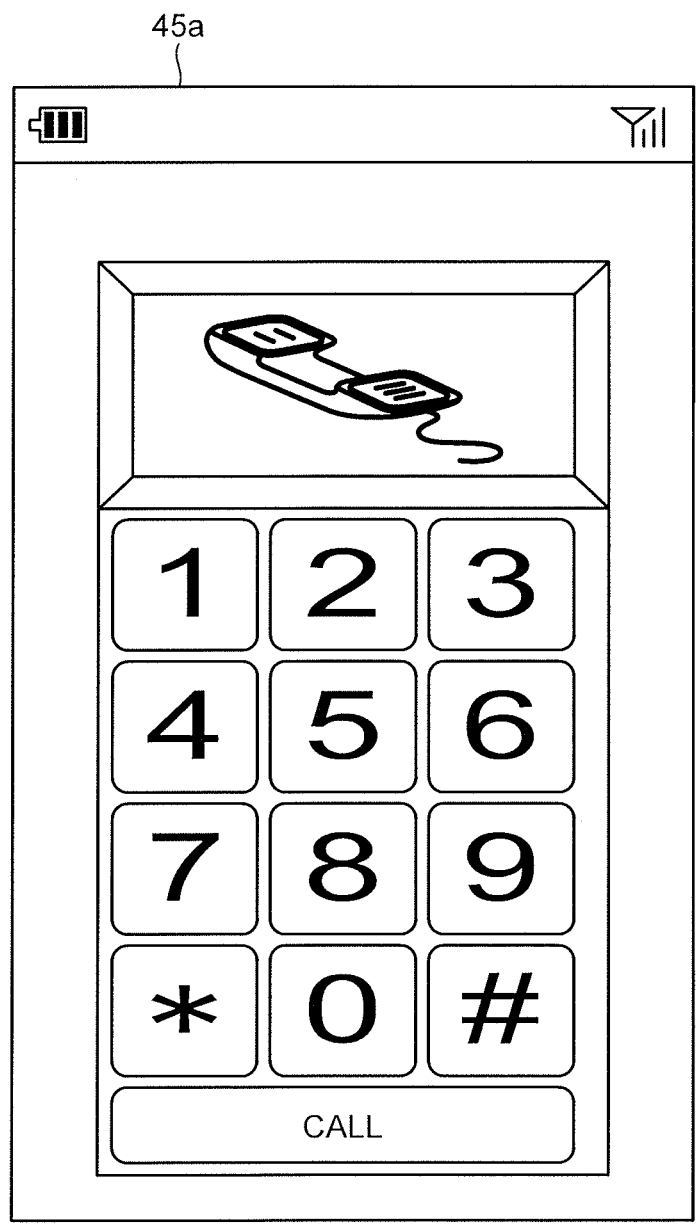
FIG. 7 is a diagram illustrating an example of a screen at a time when a program for a phone call is executed.
Figure 8:
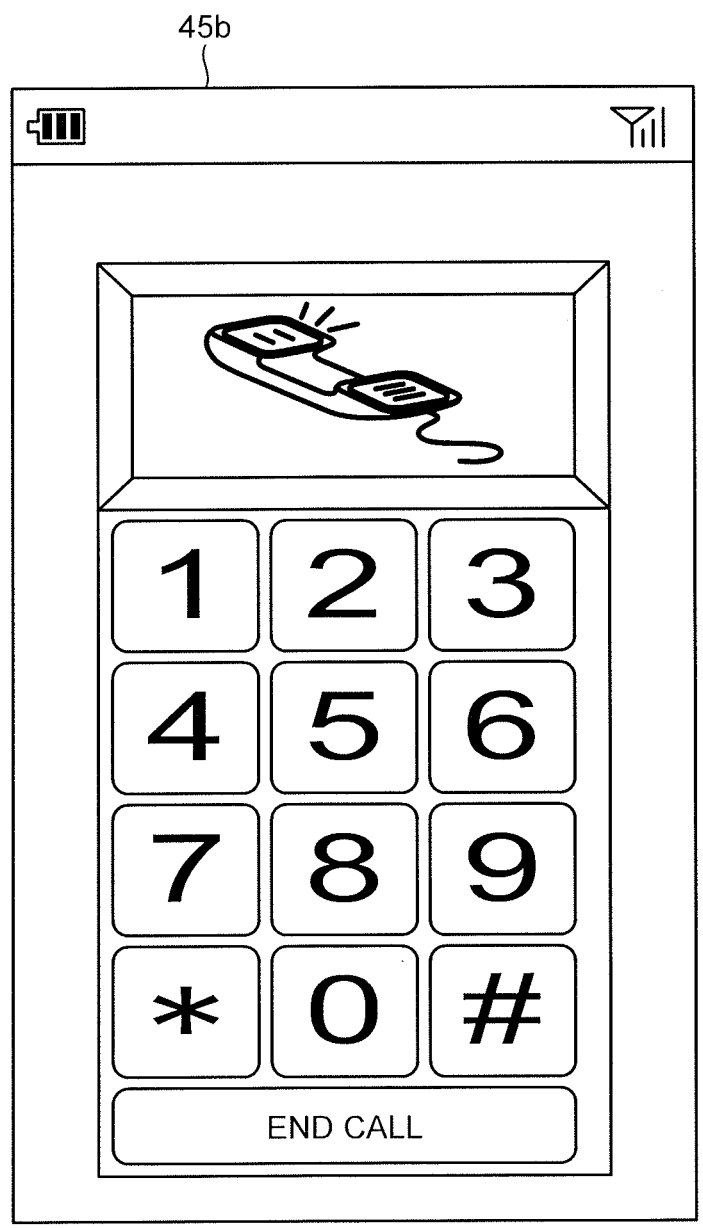
FIG. 8 is a diagram illustrating an example of a screen at a time when the program for a phone call is executed.

FIG. 6 is a schematic diagram of the home screen that is illustrated in FIG. 4 described above. FIGS. 7 and 8 illustrate examples of the screen at a time when a program for a phone call is executed. For example, when a tap on an icon 50 that is associated with the program for a phone call that is installed to the smartphone 1 is detected, the smartphone 1 executes the program for a phone call. Then, as a screen at the time of executing the program for a phone call, a phone call screen 45a illustrated in FIG. 7 is displayed on the display 2A of the touch screen 2B by the executed program for a phone call. The phone call screen 45a illustrated in FIG. 7 is an example of a screen before performing a dialing operation, and includes an image of a symbol imitating a receiver that corresponds to a before-dialing state, a keypad used for performing a dialing operation, and a call button used for the calling operation.

When a tap on the call button is detected, the phone call screen 45a illustrated in FIG. 7 transits to a phone call screen 45b illustrated in FIG. 8 by the program for a phone call. The phone call screen 45b illustrated in FIG. 8 is an example of a screen during a phone call and includes an image of a symbol imitating a receiver that corresponds to an in-call state, a keypad used for performing a dialing operation, and an end call button used for performing a phone call ending operation.

Figure 9:
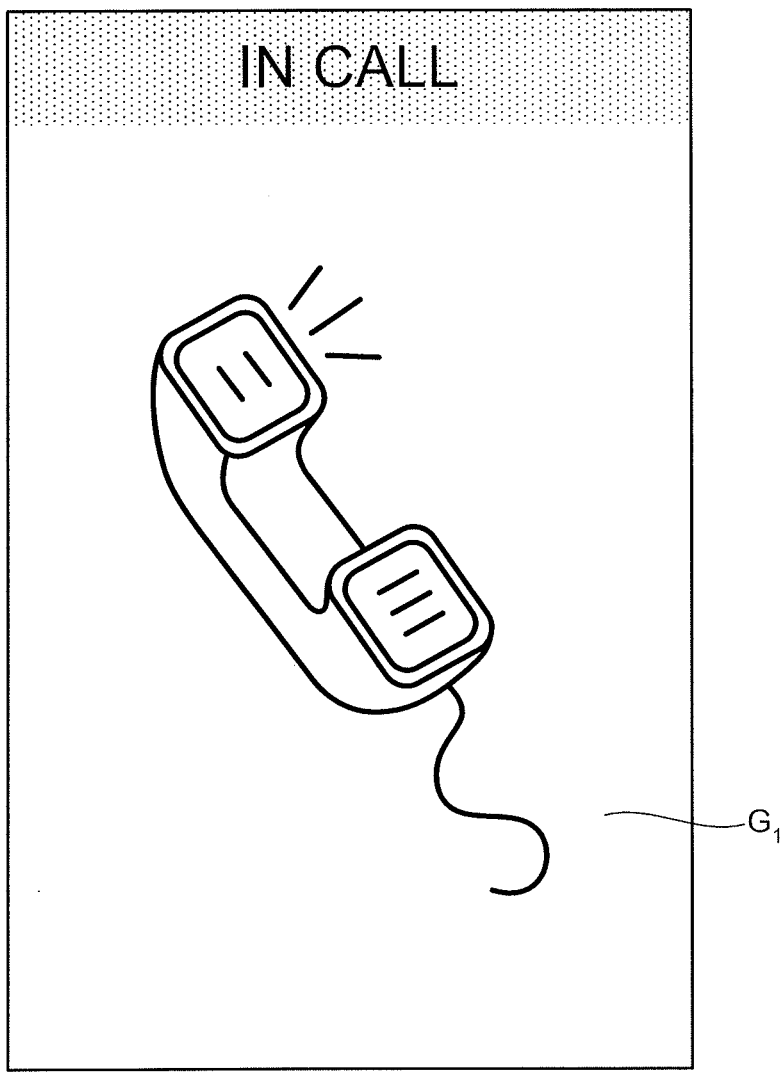
FIG. 9 is a diagram illustrating an example of a screen used for notifying a user of the ongoing execution of the program for a phone call.

FIG. 9 is a diagram illustrating an example of a screen used for notifying a user of the ongoing execution of the program for a phone call. In a case where the home screen or the like is displayed or another application is newly executed during the execution of the program for a phone call, for example, in a state in which the phone call screen 45b illustrated in FIG. 8 is displayed, the screen illustrated in FIG. 9 is generated as a screen that is used for notifying a user of the ongoing execution of the program for a phone call and forms an image layer that is generated separately from the phone call screen 45b illustrated in FIG. 8. On the screen illustrated in FIG. 9, an image $G_1$ that is used for notifying a user of the ongoing execution of the program for a phone call is displayed. The image $G_1$ is configured by an area in which an enlarged image of a symbol imitating a receiver that corresponds to an in-call state illustrated in FIG. 8 and a shaded area in which "In Call" is represented.

Figure 10:
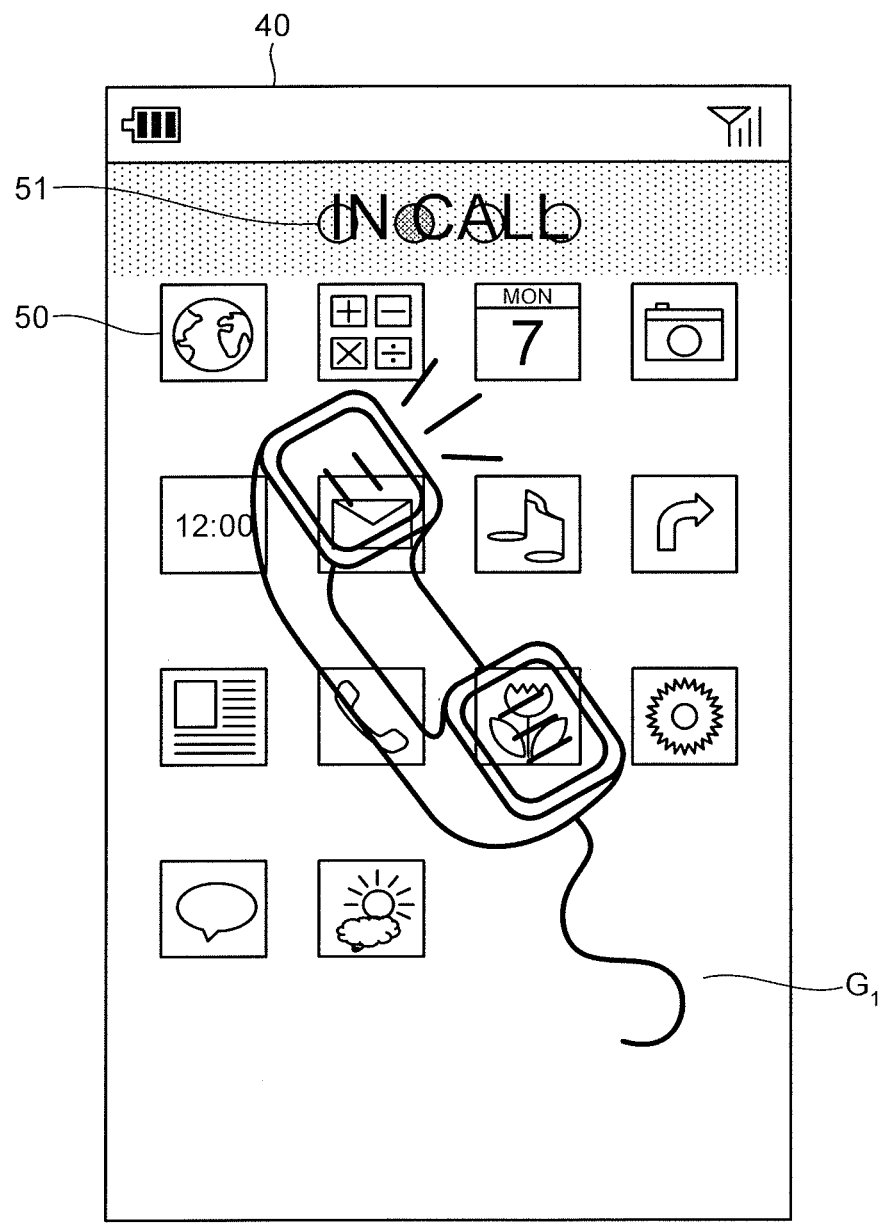
FIG. 10 is a diagram illustrating an example in which an image displayed on the screen used for notifying a user of the ongoing execution of the program for a phone call and an image displayed on the home screen are displayed in an overlapping manner.

FIG. 10 illustrates a display example in a case where an image displayed on the screen used for notifying a user of the ongoing execution of the program for a phone call and an image displayed on the home screen are displayed in an overlapping manner. FIG. 10 is a display example in a case where the home screen is displayed during the execution of the program for a phone call. For example, when an operation for displaying the home screen is performed during the execution of the program for a phone call, the smartphone 1 displays the image displayed on the screen illustrated in FIG. 9 and the image displayed on the home screen 40 illustrated in FIG. 6 on the display 2A of the touch screen 2B in an overlapping manner such that the screen illustrated in FIG. 9 is transmitted through the home screen 40 illustrated in FIG. 6. In the embodiment, for example, the image displayed on the home screen 40 illustrated in FIG. 6 is displayed on the image displayed on the screen illustrated in FIG. 9 in an overlapping manner such that the screen illustrated in FIG. 9 can be visually recognized through the home screen illustrated in FIG. 6. Accordingly, even when the user returns to the home screen in the middle of a phone call, the user does not forget that the phone call has not ended, whereby a possibility that a function that is not used is neglected in the executing state is reduced. In this case, an operation for the home screen 40 is effective on the touch screen 2B.

Figure 11:
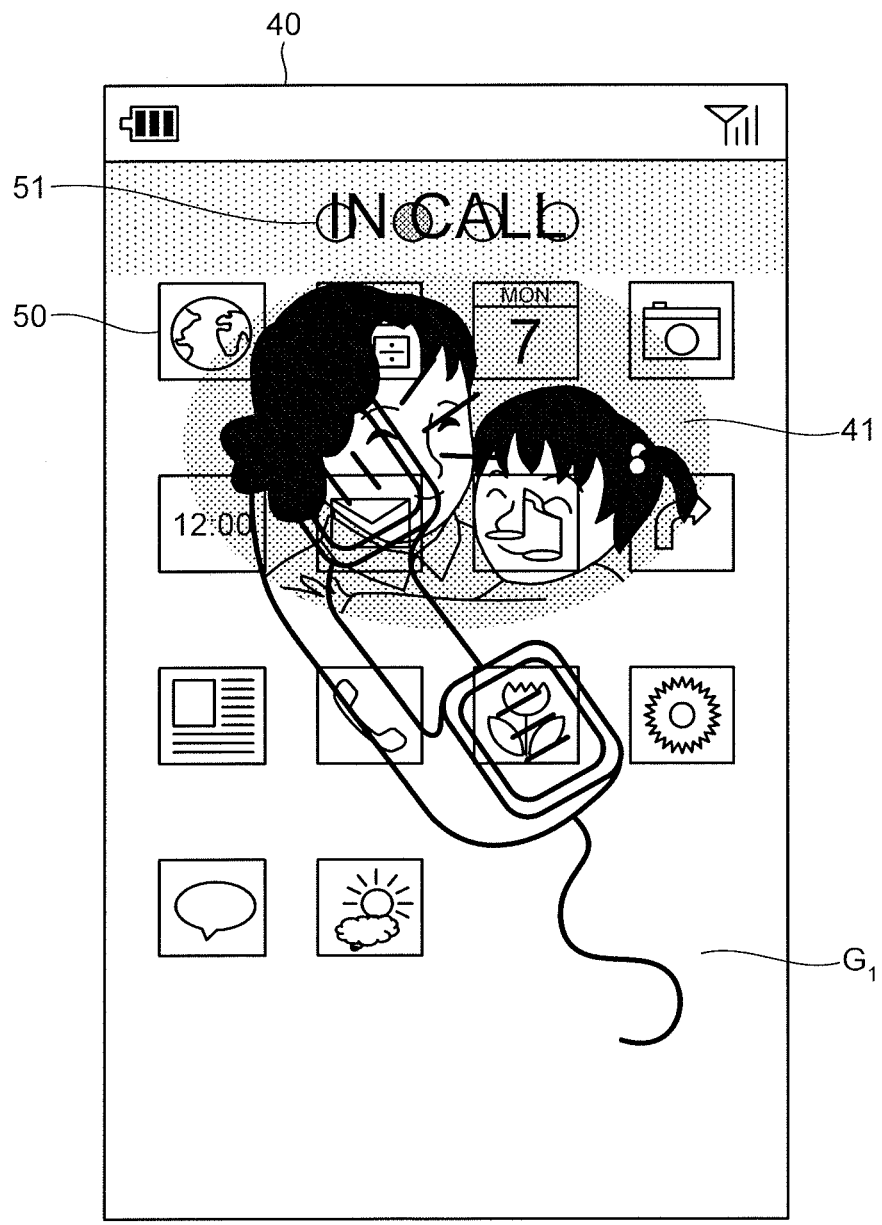
FIG. 11 is a diagram illustrating an example in which an image displayed on the screen used for notifying a user of the ongoing execution of the program for a phone call and an image displayed on the home screen are displayed in an overlapping manner.

FIG. 11, similarly to FIG. 10, illustrates a display example in a case where an image displayed on the screen used for notifying a user of the ongoing execution of the program for a phone call and an image displayed on the home screen are displayed in an overlapping manner. FIG. 11 is a display example in a case where a wall paper 41 other than a plain wall paper is set on the home screen. Even in a case where the wall paper 41 other than a plain wall paper is set on the home screen, the smartphone 1 displays the image displayed on the screen illustrated in FIG. 9 and the image displayed on the home screen 40 illustrated in FIG. 6 on the display 2A of the touch screen 2B in an overlapping manner such that the screen illustrated in FIG. 9 is transmitted through the home screen 40 illustrated in FIG. 6. In the embodiment, for example, the image displayed on the home screen 40 illustrated in FIG. 6 is displayed on the image displayed on the screen illustrated in FIG. 9 in an overlapping manner such that the screen illustrated in FIG. 9 can be visually recognized through the home screen illustrated in FIG. 6.

In FIG. 10 or 11, the method of overlapping the images may be arbitrary as long as both the image displayed on the screen used for notifying a user of the ongoing execution of the program for a phone call and the image displayed on the home screen can be seen. Any one of the images may be relatively positioned on the front side. For example, the images may overlap each other as layers. The image presented during a phone call may be displayed between layers of another application. The image presented during a phone call may be composed with an image of another application, and the image presented during a phone call may be set to be displayed as a background of another application or an image of the wall paper.

Figure 12:
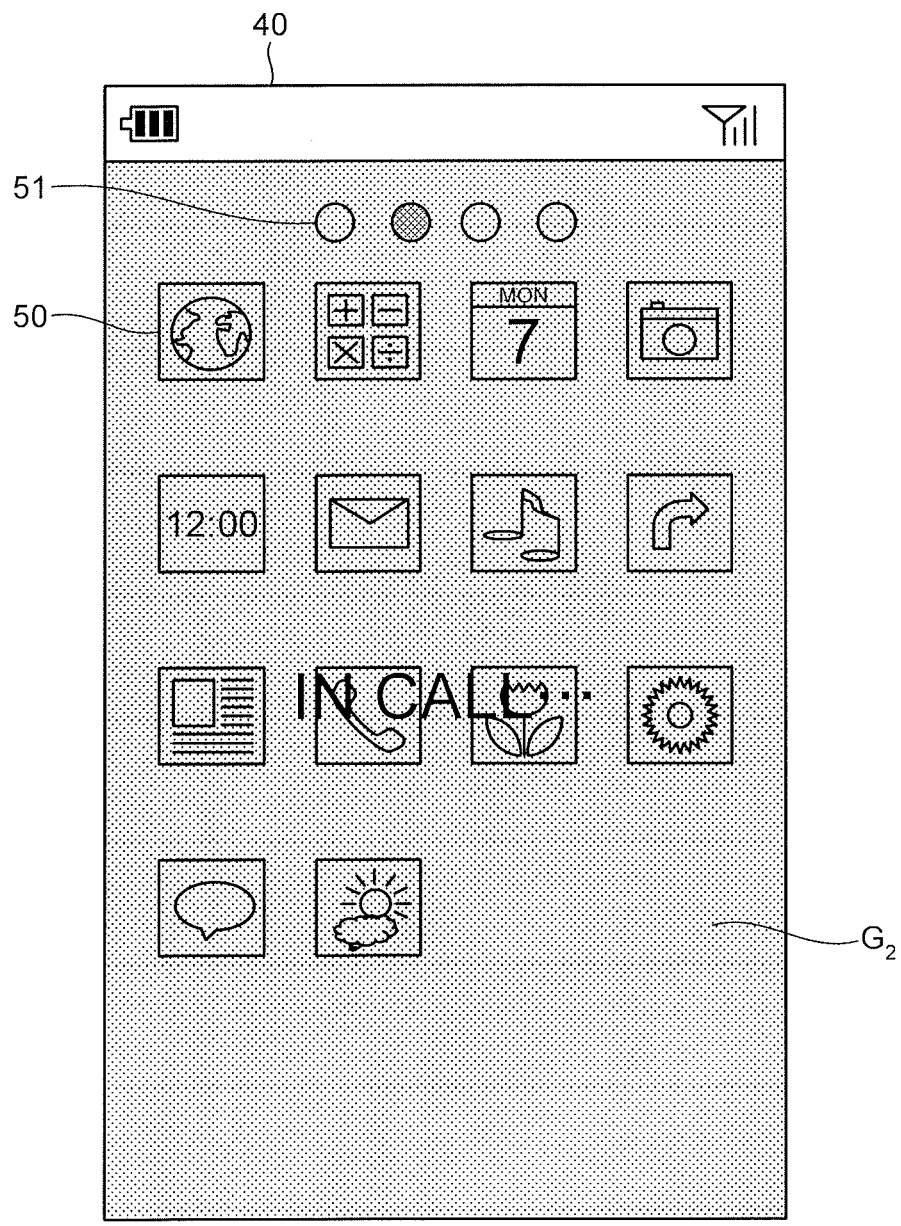
FIG. 12 is a diagram illustrating an example in which an image displayed on the screen used for notifying a user of the ongoing execution of the program for a phone call and an image displayed on the home screen are displayed in an overlapping manner.

Similarly to FIGS. 10 and 11, FIG. 12 illustrates a display example of a case in which an image displayed on the screen used for notifying a user of the ongoing execution of the program for a phone call and an image displayed on the home screen are displayed in an overlapping manner. FIG. 12 is an example of a display in a case where an image $G_2$ that is configured by a predetermined color scheme and a character string of "In Call" is employed as the image used for notifying a user of the ongoing execution of the program for a phone call. The smartphone 1 displays the image displayed on the screen illustrated in FIG. 12 and the image displayed on the home screen 40 illustrated in FIG. 6 on the display 2A of the touch screen 2B in an overlapping manner such that the home screen 40 illustrated in FIG. 6 is transmitted through the screen illustrated in FIG. 12. Thus, a predetermined screen may be configured in various forms capable of clearly indicating an ongoing phone call to the user, such as an image that is configured only by a color scheme and an image, for which a predetermined color scheme is applied, being turned on and off at a predetermined interval.

Figure 13:
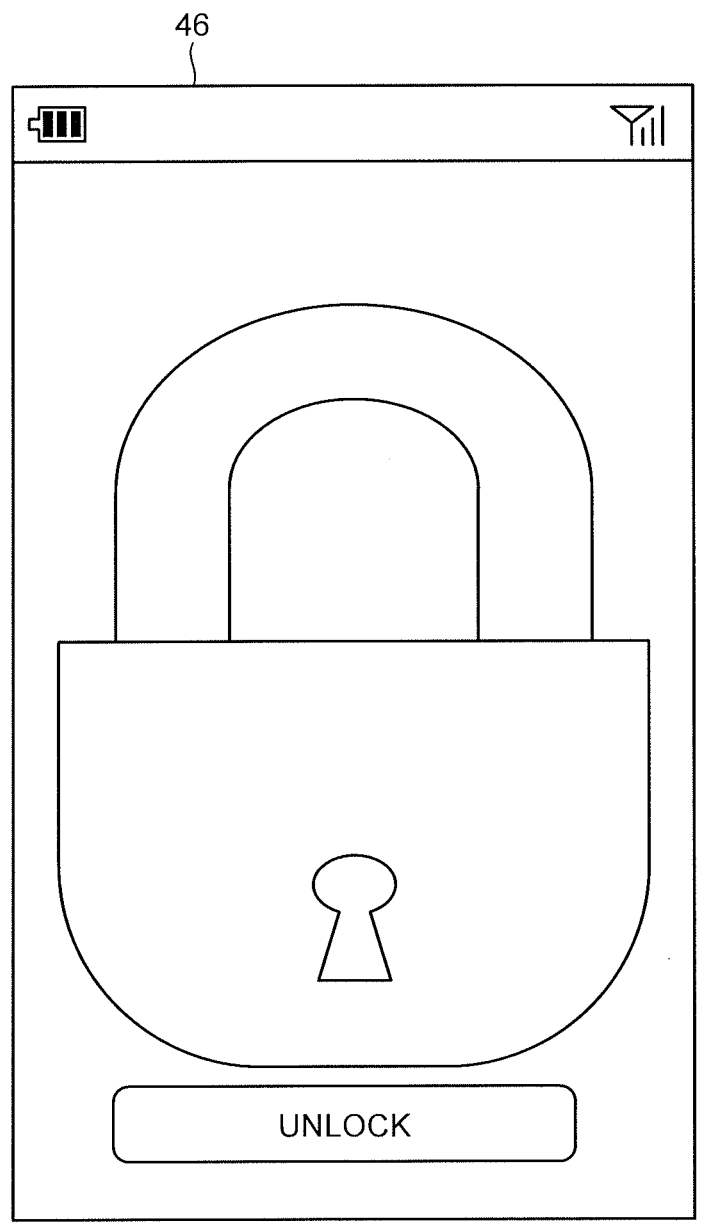
FIG. 13 is a diagram illustrating an example of a lock screen.

FIG. 13 illustrates an example of a lock screen. The lock screen is a screen that is initially displayed on the display 2A at the time of starting up the smartphone 1 or returning from a standby state, and, for example, the home screen as illustrated in FIG. 4 is displayed by releasing the locked state. Here, the standby state represents a state of the smartphone 1 in which the display 2A is turned off, and an operation for the touch screen 2B cannot be performed although the state is a power-on state. For example, in the embodiment, as an example of the lock screen 46, a screen that includes an image of a lock and an unlock button that is used for performing an operation of releasing the locked state will be described.

Figure 14:
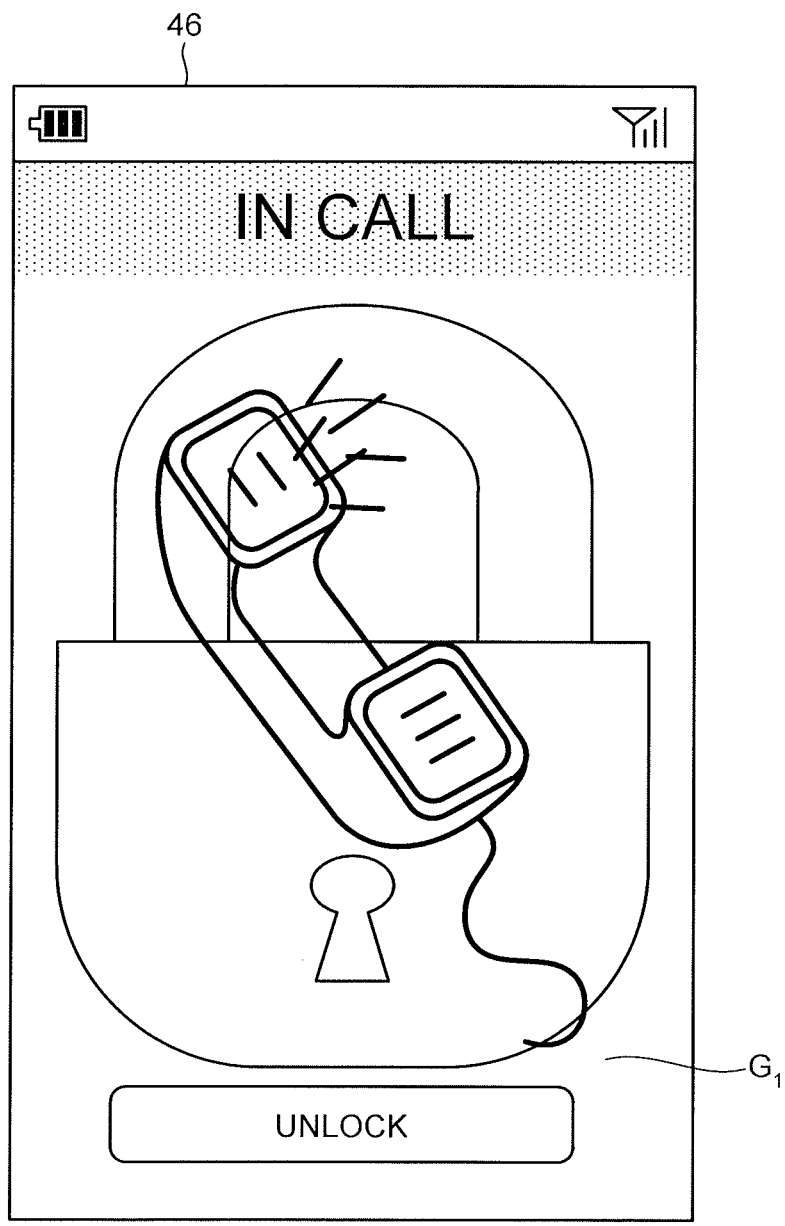
FIG. 14 is a diagram illustrating an example in which an image displayed on the screen used for notifying a user of the ongoing execution of the program for a phone call and an image displayed on the lock screen are displayed in an overlapping manner.

FIG. 14 illustrates a display example in a case where an image displayed on the screen used for notifying a user of the ongoing execution of the program for a phone call and an image displayed on the lock screen are displayed in an overlapping manner. FIG. 14 is an example of a display in a case where the lock screen is displayed during the execution of the program for a phone call. For example, when an operation of displaying a lock screen is performed during the execution of the program for a phone call, the smartphone 1 displays the image displayed on the screen illustrated in FIG. 9 and the image displayed on the lock screen 46 illustrated in FIG. 13 on the display 2A of the touch screen 2B in an overlapping manner such that the screen illustrated in FIG. 9 is transmitted through the lock screen illustrated in FIG. 13. In the embodiment, for example, the image displayed on the lock screen 46 illustrated in FIG. 13 is displayed on the image displayed on the screen illustrated in FIG. 9 in an overlapping manner such that the screen illustrated in FIG. 9 can be visually recognized through the lock screen 46 illustrated in FIG. 13. Accordingly, even when a user sets the smartphone 1 in the standby state while misunderstanding that an operation of ending the phone call has been performed, the user can quickly notice that the phone call state is continued at timing when the lock screen is displayed, whereby a possibility that a function that is not used is neglected in the executing state is reduced. In this case, an operation for the lock screen 46 is effective on the touch screen 2B.

Figure 15:
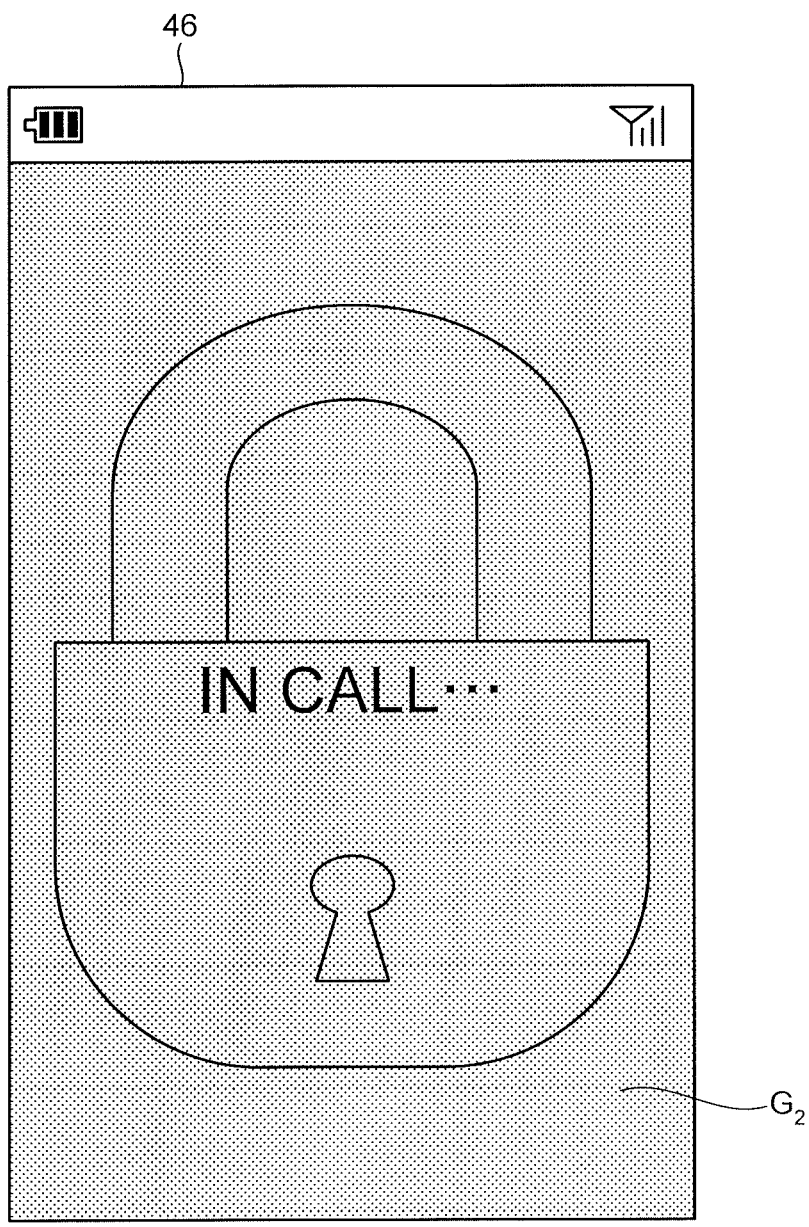
FIG. 15 is a diagram illustrating an example in which an image displayed on the screen used for notifying a user of the ongoing execution of the program for a phone call and an image displayed on the lock screen are displayed in an overlapping manner.

FIG. 15, similarly to FIG. 14, illustrates a display example in a case where an image displayed on the screen used for notifying a user of the ongoing execution of the program for a phone call and an image displayed on the lock screen are displayed in an overlapping manner. FIG. 15 is an example of a display in a case where an image $G_2$ configured by a predetermined color scheme and a character string of "In Call" is employed as a screen that is used for notifying a user of the ongoing execution of the program for a phone call. The smartphone 1 displays the image $G_2$ displayed on the screen illustrated in FIG. 12 and the image displayed on the lock screen illustrated in FIG. 13 on the display 2A of the touch screen 2B in an overlapping manner such that the image $G_2$ illustrated in FIG. 12 is transmitted through the lock screen illustrated in FIG. 13.

Figure 16:
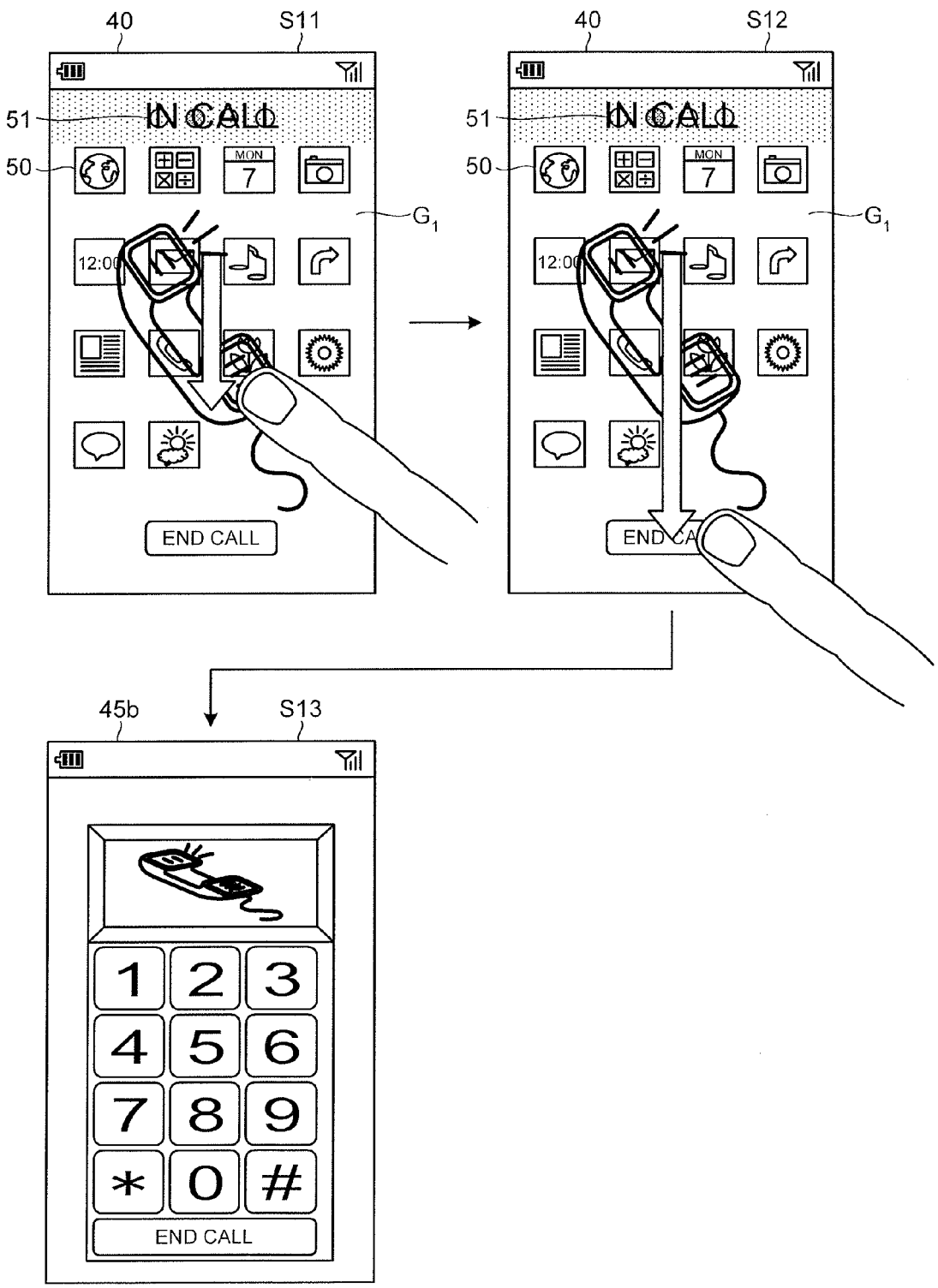
FIG. 16 is a diagram illustrating an example of a display of screens switched in accordance with a user's operation.

FIG. 16 illustrates an example of a display of screens switched in accordance with a user's operation. FIG. 16 is an example of switching between screen displays in accordance with a user's operation in a case where the display illustrated in FIG. 10 described above is made. In Step S11 illustrated in FIG. 16, the image displayed on the home screen 40 illustrated in FIG. 6 and the image displayed on the screen illustrated in FIG. 9 are displayed on the touch screen 2B in an overlapping manner. Through Steps S11 to S12, a user's finger moves toward the lower side at an area near the center of the screen in continuous contact with the touch screen 2B.

When the user's operation is performed through Steps S11 and S12, the smartphone 1 detects a downward sweep on the screen on which the image displayed on the home screen 40 illustrated in FIG. 6 and the image displayed on the screen illustrated in FIG. 9 are displayed in an overlapping manner through the touch screen 2B. Subsequently, as illustrated at Step S13 illustrated in FIG. 16, the smartphone 1 switches the screen on which the image displayed on the home screen 40 illustrated in FIG. 6 and the image displayed on the screen illustrated in FIG. 9 are displayed on the display 2A of the touch screen 2B in an overlapping manner to the phone call screen 45b (FIG. 8) of the program for a phone call that is in the middle of execution for display at time point when the downward sweep is not detected. By thus switching between displays, switching to a state in which an operation for the phone call screen 45b can be performed on the touch screen 2B is achieved. The smartphone 1 may be configured to measure a distance of the downward sweep and perform switching between the screens in a case where the measured distance of the sweep is longer than a half of the maximum size along the display face of the display 2A in the vertical direction or more, whereby a possibility the switching between the screens is unstable due to a too sensitive reaction to a user's operation is reduced.

Figure 17:
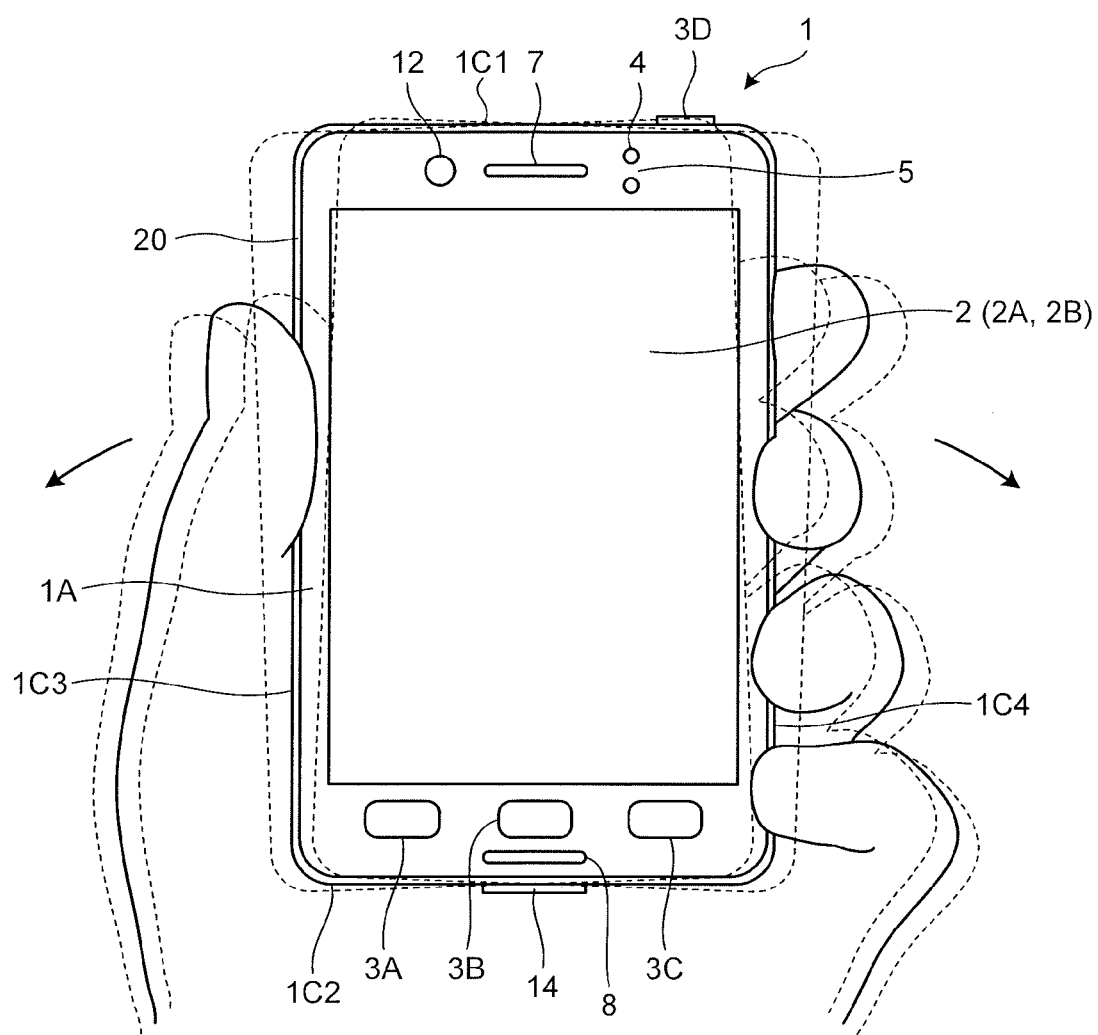
FIG. 17 is a diagram illustrating an example of an operation of shaking the device.

As illustrated in FIG. 17, the smartphone 1 may be configured to switch the screen on which the image displayed on the screen represented in FIG. 6 and the image displayed on the screen represented in FIG. 9 overlap each other to the phone call screen 45b in accordance with an operation of shaking the smartphone 1 that is detected through an acceleration sensor 15 or the like. Furthermore, the smartphone 1 may be configured to switch the screens at time point when the number of shaking operations reaches a predetermined number of times, whereby a possibility that an interference occurs with any other application in a case where a plurality of applications are performed in parallel for multi-tasking is reduced.

Figure 18:
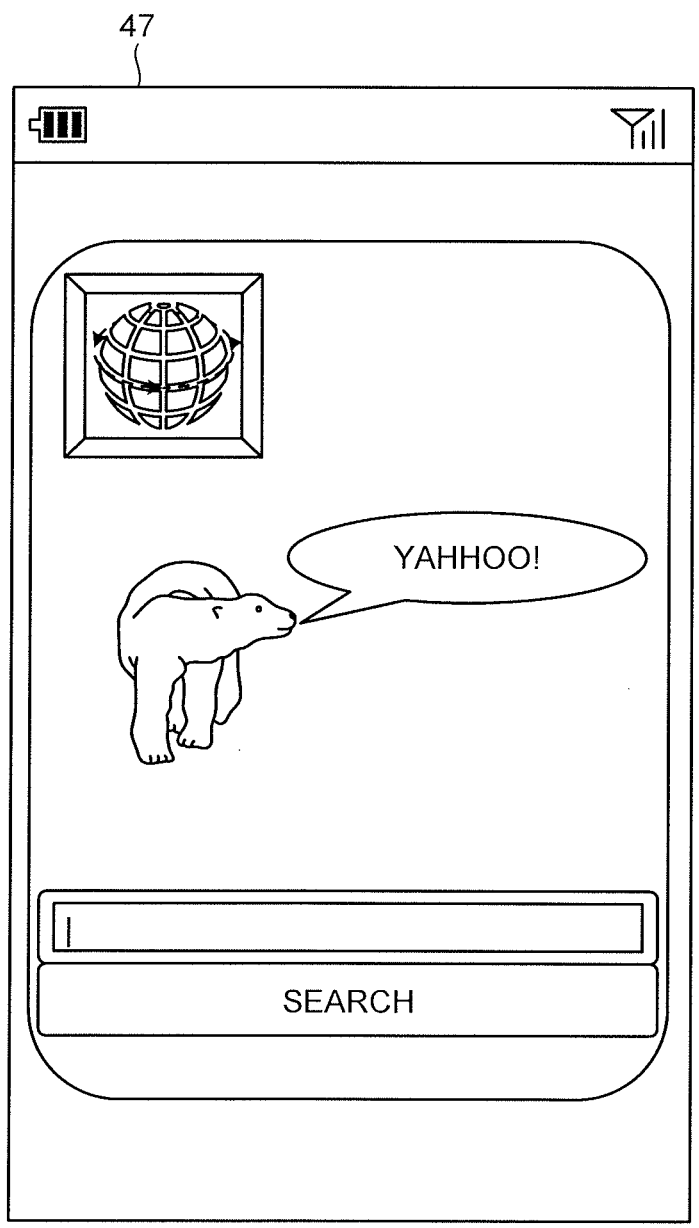
FIG. 18 is a diagram illustrating an example of a screen of a web page that corresponds to a predetermined search engine accessed by a web browser.

FIG. 18 illustrates an example of a screen of a web page that corresponds to a predetermined search engine that is accessed using a web browser function. For example, when a tap on the icon 50 that is associated with the browser application installed to the smartphone 1 is detected, the smartphone 1 executes the browser application. Then, by the executed browser application, a screen 47 of a web page illustrated in FIG. 18 as a screen displaying a predetermined search engine that is browsed is displayed on the display 2A of the touch screen 2B. The screen 47 of the web page illustrated in FIG. 18 is in a state in which a mark representing that the browser application is in the middle of execution is displayed in the upper area of a predetermined web page that includes an image of a symbol of a bear, an input box used for inputting a search query, and a search button used for requesting for the execution of the search.

Figure 19:
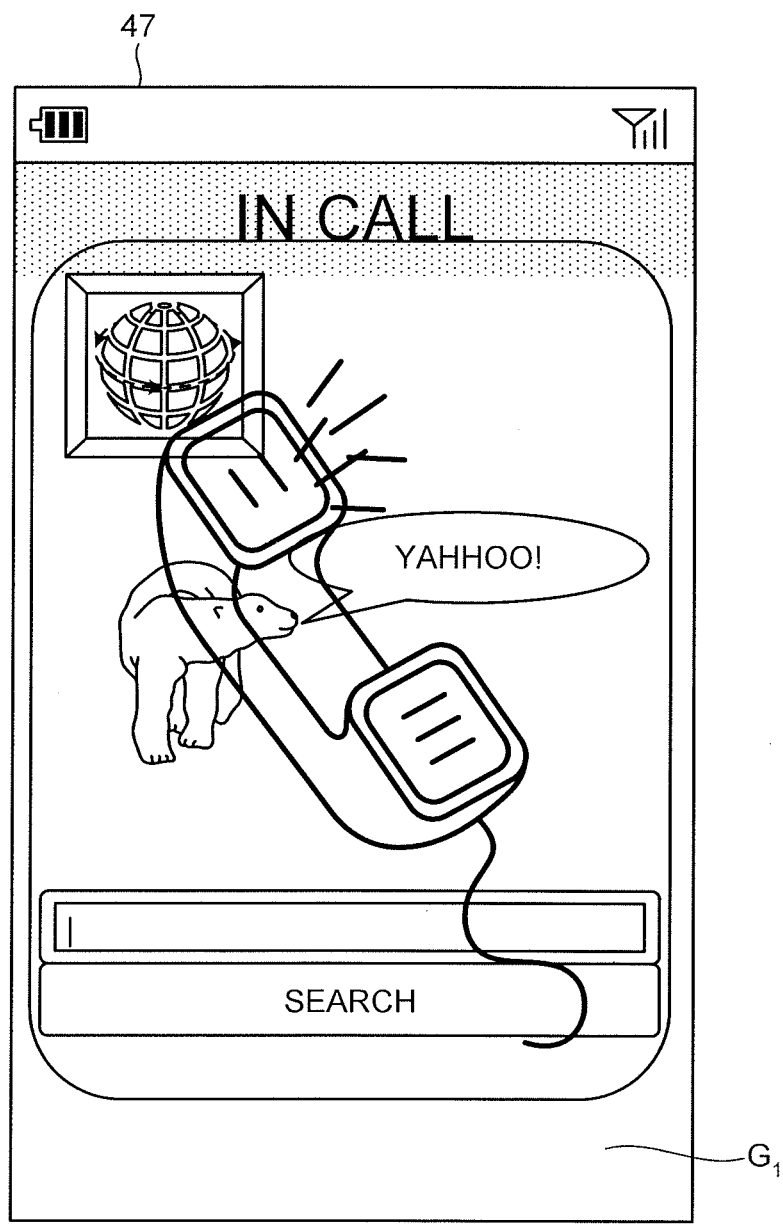
FIG. 19 is a diagram illustrating an example in which an image displayed on the screen used for notifying a user of the ongoing execution of the program for a phone call and an image displayed on the screen of a web page are displayed in an overlapping manner.

FIG. 19 illustrates a display example of a case where an image displayed on the screen used for notifying a user of the ongoing execution of the program for a phone call and an image displayed on the screen of a web page overlap each other. FIG. 19 is an example of a display in a case where the screen 47 of a web page is displayed during the execution of the program for a phone call. For example, when an access to a web page is performed while the program for a phone call is executed, the smartphone 1 displays the image displayed on the screen illustrated in FIG. 9 and the image displayed on the screen 47 of the web page illustrated in FIG. 18 on the display 2A of the touch screen 2B in an overlapping manner such that the screen illustrated in FIG. 9 is transmitted through the screen 47 of the web page illustrated in FIG. 18. In the embodiment, for example, the image displayed on the screen 47 of the web page illustrated in FIG. 18 is displayed on the image displayed on the screen illustrated in FIG. 9 in an overlapping manner such that the screen illustrated in FIG. 9 can be visually recognized through the screen 47 of the web page illustrated in FIG. 18. Accordingly, even when a user accesses a web page during a phone call, the user does not forget that the phone call has not ended. In this case, an operation for the screen 47 of the web page is effective on the touch screen 2B.

Figure 20:
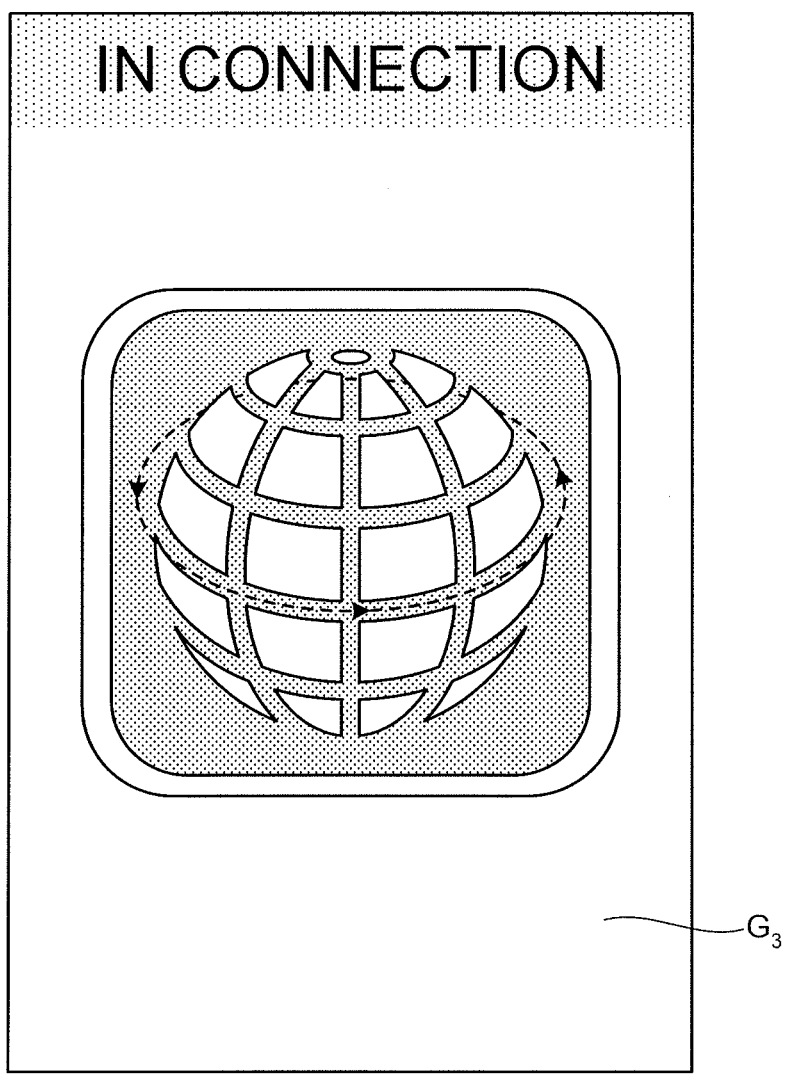
FIG. 20 is a diagram illustrating an example of a screen used for notifying a user of the ongoing execution of a browser application.

FIG. 20 illustrates an example of a screen that is used for notifying a user of the ongoing execution of the browser application. In a case where the home screen or the like is displayed or another application is newly executed while the browser application is executed, the screen illustrated in FIG. 20 is generated as a screen that is used for notifying a user of the ongoing execution of the browser application and forms an image layer that includes an image of a web site accessed by the browser application or an image $G_3$ which is generated separately from an image of the web page.

Figure 21:
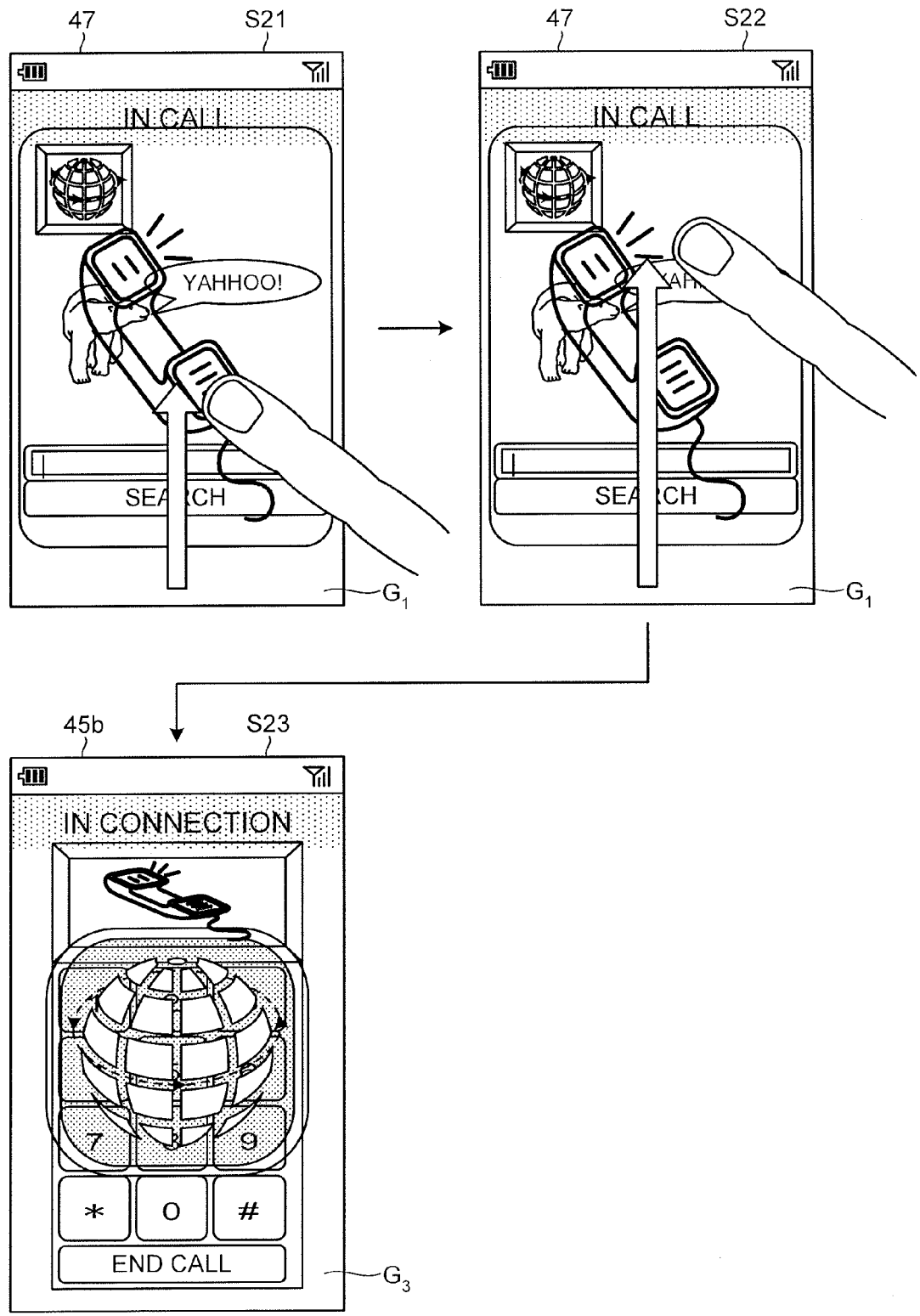
FIG. 21 is a diagram illustrating an example of a display of screens switched in accordance with a user's operation.

FIG. 21 illustrates an example of a display of screens switched in accordance with a user's operation. FIG. 21 is an example of changing the screen display in accordance with a user's operation in a case where the screen illustrated in FIG. 19 described above is displayed. In Step S21 illustrated in FIG. 21, the image illustrated on the screen illustrated in FIG. 9 and the image displayed on the screen 47 of the web page illustrated in FIG. 18 are displayed on the touch screen 2B in an overlapping manner. Through Steps S21 and S22, a user's finger moves from the lower side of the screen toward the upper side at an area near the center of the screen in continuous contact with the touch screen 2B.

When the user's operation is performed through Steps S21 and S22, the smartphone 1 detects an upward sweep on the screen on which the image displayed on the screen illustrated in FIG. 9 and the image displayed on the screen illustrated in FIG. 18 are displayed in an overlapping manner through the touch screen 2B. Subsequently, at time point when the upward sweep is not detected, the smartphone 1, as illustrated at Step S23 represented in FIG. 21, changes the display of the screen on which the image displayed on the screen illustrated in FIG. 9 and the image displayed on the screen 47 of the web page illustrated in FIG. 18 are displayed on the display 2A of the touch screen 2B in an overlapping manner such that an operation for the phone call screen 45*b* (FIG. 8) of the program for a phone call that is in the middle of the execution can be performed. In other words, the smartphone 1 displays the image $G_3$ displayed on the screen illustrated in FIG. 20 and the image displayed on the phone call screen 45*b* illustrated in FIG. 8 in an overlapping manner such that the screen illustrated in FIG. 20 is transmitted through the phone call screen 45*b* illustrated in FIG. 8. In the embodiment, for example, the image displayed on the phone call screen 45*b* illustrated in FIG. 8 is displayed on the image $G_3$ displayed on the screen illustrated in FIG. 20 in an overlapping manner such that the screen illustrated in FIG. 20 can be visually recognized through the phone call screen 45*b* illustrated in FIG. 8. In the embodiment, the image displayed on the phone call screen 45*b* illustrated in FIG. 8 is displayed on the image $G_3$ displayed on the screen illustrated in FIG. 20 in an overlapping manner. Through the switching between the displays, the state is switched to a state in which an operation for the phone call screen 45*b* can be performed on the touch screen 2B.

Figure 22:
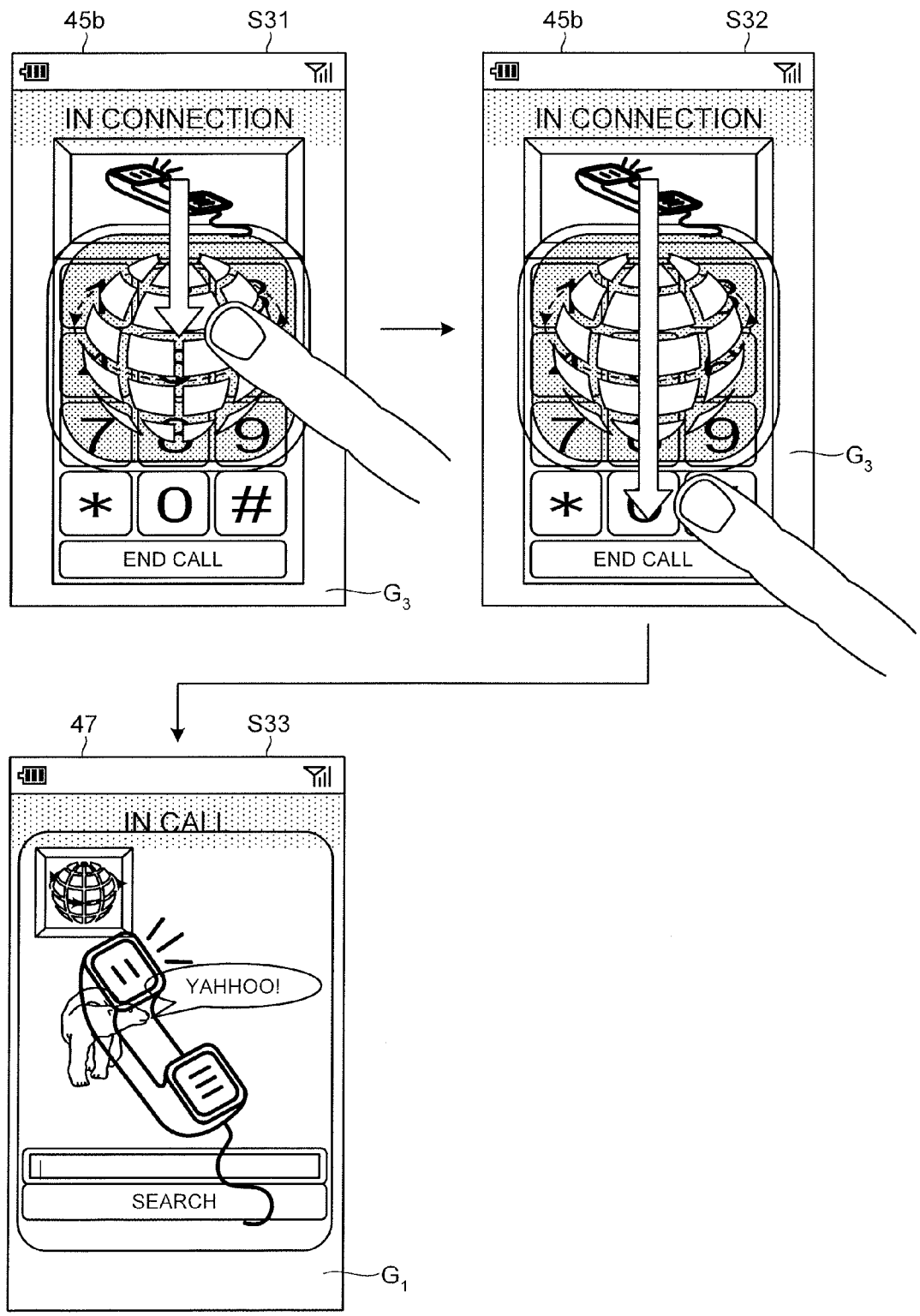
FIG. 22 is a diagram illustrating an example of a display of screens switched in accordance with a user's operation.

FIG. 22 is a diagram illustrating an example of display switching between screens from the state illustrated in FIG. 21 to the state illustrated in FIG. 19 in accordance with a user's operation again. In Step S31 illustrated in FIG. 22, the image displayed on the phone call screen 45*b* illustrated in FIG. 8 and the image $G_3$ displayed on the screen illustrated in FIG. 20 are displayed on the touch screen 2B in an overlapping manner. Through Steps S31 and S32, a user's finger moves toward the lower side of the screen at an area near the center of the screen, in other words, in a direction opposite to the movement direction of the finger illustrated in FIG. 21 in continuous contact with the touch screen 2B.

When the user's operation is performed through Steps S31 and S32, the smartphone 1 detects a downward sweep on the screen on which the image displayed on the phone call screen 45*b* illustrated in FIG. 8 and the image $G_3$ displayed on the screen illustrated in FIG. 20 are displayed in an overlapping manner through the touch screen 2B. Subsequently, at time point when the downward sweep is not detected, the smartphone 1, as illustrated at Step S33 represented in FIG. 22, changes the display of the screen on which the image displayed on the phone call screen 45*b* illustrated in FIG. 8 and the image $G_3$ displayed on the screen illustrated in FIG. 20 are displayed on the display 2A of the touch screen 2B in an overlapping manner such that, contrary to the case illustrated in FIG. 21, an operation for the screen 47 (FIG. 18) of the web page displayed by the browser application that is in the middle of the execution can be performed. In other words, similarly to FIG. 19, the smartphone 1 displays the image displayed on the screen illustrated in FIG. 9 and the image displayed on the screen 47 of the web page illustrated in FIG. 18 in an overlapping manner such that the screen illustrated in FIG. 9 is transmitted through the screen 47 of the web page illustrated in FIG. 18. Through the switching between the displays, the state is switched to a state in which an operation for the screen 47 of the web page can be performed on the touch screen 2B.

As illustrated in FIG. 17, the smartphone 1 may be configured to switch the display between the phone call screen 45*b* and the screen 47 of the web page in accordance with an operation of shaking the smartphone 1. In a case where the program for a phone call and the browser application are executed in parallel as illustrated in FIG. 19 or 21, 22, and the like, when any one of the programs is operated to end, only the screen that corresponds to the program that is in the middle of the execution is displayed.

Figure 23:
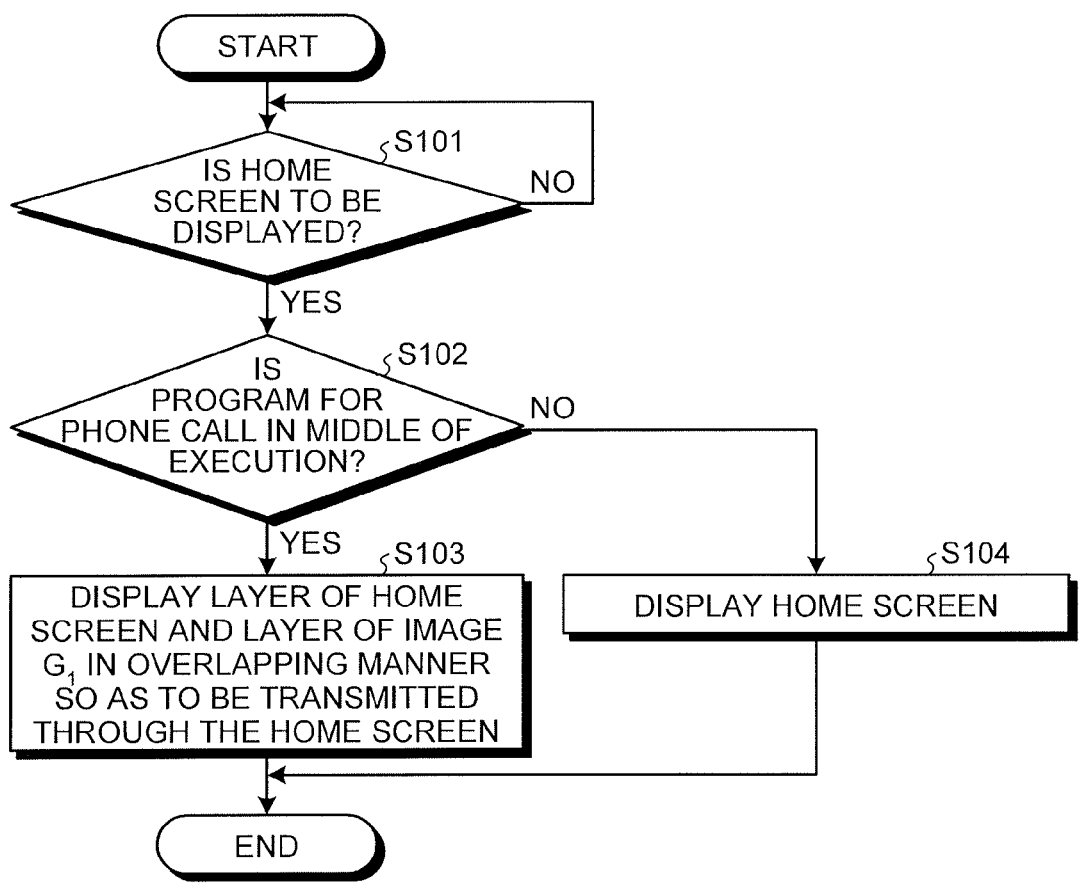
FIG. 23 is a diagram illustrating an example of the process sequence of a control process of displaying an image displayed on the screen used for notifying a user of the ongoing execution of the program for a phone call and an image displayed on the home screen in an overlapping manner.
Figure 24:
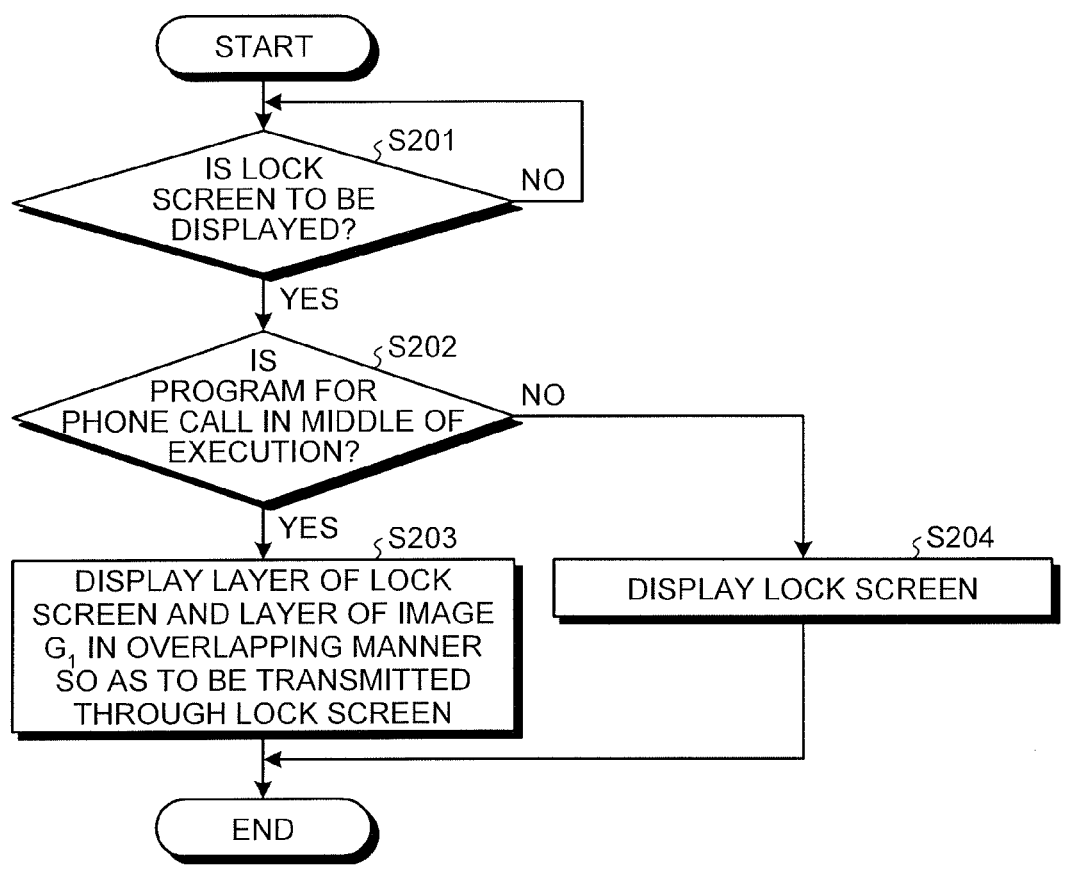
FIG. 24 is a diagram illustrating an example of the process sequence of a control process of displaying an image displayed on the screen used for notifying a user of the ongoing execution of the program for a phone call and an image displayed on the lock screen in an overlapping manner.
Figure 25:
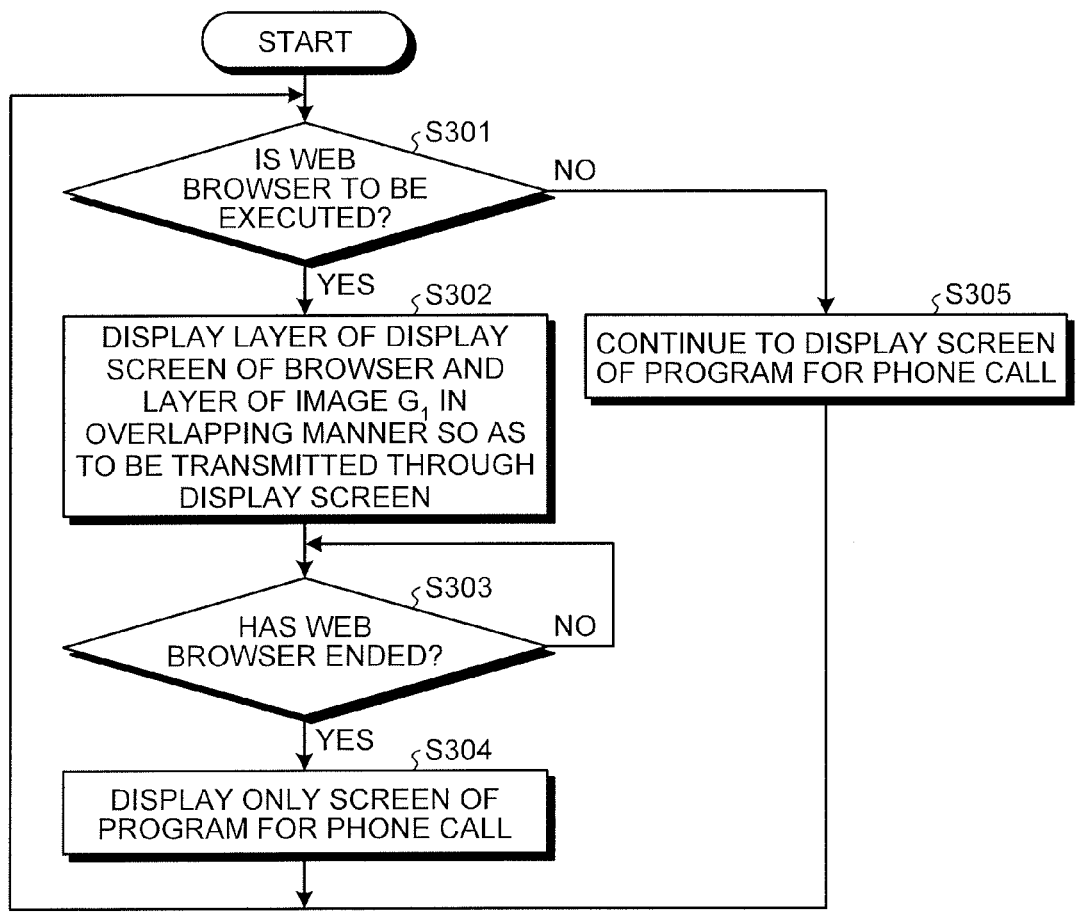
FIG. 25 is a diagram illustrating an example of the process sequence of a control process of displaying an image displayed on the screen used for notifying a user of the ongoing execution of the program for a phone call and an image displayed on the screen of a web page in an overlapping manner.

An example of the process sequence of a control process that is based on the functions provided by the control program 9A will be described with reference to FIGS. 23 to 25. FIG. 23 illustrates an example of the process sequence of a control process of displaying an image displayed on the screen used for notifying a user of the ongoing execution of the program for a phone call and an image displayed on the home screen in an overlapping manner. FIG. 24 illustrates an example of the process sequence of a control process of displaying an image displayed on the screen used for notifying a user of the ongoing execution of the program for a phone call and an image displayed on the lock screen in an overlapping manner. FIG. 25 illustrates an example of the process sequence of a control process of displaying an image displayed on the screen used for notifying a user of the ongoing execution of the program for a phone call and an image displayed on the screen of a web page in an overlapping manner.

The process sequences illustrated in FIGS. 23 to 25 are realized by executing the control program 9A using a controller 10.

First of all, an example of the process sequence of a control, process of displaying an image displayed on the screen used for notifying a user of the ongoing execution of the program for a phone call and an image displayed on the home screen in an overlapping manner will be described with reference to FIG. 23.

The controller 10 performs a process of determining whether to display the home screen 40 at Step S101. For example, in a case where the smartphone 1 receives an operation of pressing the button 3B or the like from a user in a state (a state in which an application is executed) before being moved to the standby state, the controller 10 derives a determination result that indicates to perform the display of the home screen 40. On the other hand, in a case where an operation of pressing the button 3B or the like is not received from a user, the controller 10 derives a determination result that indicates not to perform the display of the home screen 40 and repeatedly performs the same determination process of Step S101 with the determination of Step S101 as "No".

In a case where the determination result indicating to perform the display of the home screen 40 is derived (Yes at Step S101), subsequently, the controller 10 determines whether the program for a phone call is in the middle of execution at Step S102. For example, in a case where a task of the program for a phone call is in the middle of the execution, the controller 10 derives a determination result indicating that the program for a phone call is in the middle of execution.

In a case where the determination result indicating that the program for a phone call is in the middle of execution is derived (Yes at Step S102), the controller 10 displays the layer of the image displayed on the home screen 40 (FIG. 6) and the layer of the image $G_1$ displayed on the screen (FIG. 9) used for notifying a user of the ongoing execution of the program for a phone call on the display 2A of the touch screen 2B in an overlapping manner so as to be transmitted through the home screen 40 at Step S103, and the process ends.

On the other hand, in a case where the determination result indicating that the program for a phone call is not in the middle of execution is derived (No at Step S102), the controller 10 displays the home screen 40 on the display 2A of the touch screen 2B at Step S104, and the process ends.

Next, an example of the process sequence of a control process of displaying the image displayed on the screen used for notifying a user of the ongoing program for a phone call and the image displayed on the lock screen in an overlapping manner will be described with reference to FIG. 24.

The controller 10 performs a process of determining whether to display the lock screen 46 at Step S201. For example, in a case where an operation of pressing the button 3B, 3D, or the like is received from a user in the standby state of the smartphone 1, the controller 10 derives the determination result that indicates to display the lock screen 46. On the other hand, in a case where an operation of pressing the button 3B, 3D, or the like is not received from a user, the controller 10 derives the determination result that indicates not to display the lock screen 46 and repeatedly performs the same determination of Step S201 with the determination of Step S201 as "No".

In a case where the determination result that indicates to display the lock screen 46 (Yes at Step S201), the controller 10 subsequently determines whether the program for a phone call is in the middle of execution at Step S202. For example, in a case where a task of the program for a phone call is in the middle of execution, the controller 10 derives the determination result indicating that the program for a phone call is in the middle of execution.

In a case where the determination result indicating that the program for a phone call is in the middle of execution is derived (Yes at Step S202), the controller 10 displays the layer of the image displayed on the lock screen 46 (FIG. 13) and the layer of the image $G_1$ displayed on the screen (FIG. 9) used for notifying a user of the ongoing program for a phone call on the display 2A of the touch screen 2B in an overlapping manner so as to be transmitted through the lock screen 46 at Step S203, and the process ends.

On the other hand, in a case where the determination result indicating that the program for a phone call is not in the middle of execution is derived (No at Step S202), the controller 10 displays the lock screen 46 on the display 2A of the touch screen 2B at Step S204, and the process ends.

Next, an example of the process sequence of a control process of displaying an image displayed on the screen used for notifying a user of the ongoing execution of the program for a phone call and an image displayed on the screen of a web page in an overlapping manner will be described with reference to FIG. 25. With reference to FIG. 25, the sequence of a control process of a screen display in a case where a predetermined web page is accessed by executing a web browser during the execution of the program for a phone call will be described.

The controller 10 determines whether to execute a web browser at Step S301. As a result of the determination, in a case where the web browser is to be executed (Yes at Step S301), the controller 10 displays the layer of the image of the display screen according to the browser and the layer of the image $G_1$ displayed on the screen used for notifying a user of the ongoing execution of the program for a phone call on the display 2A of the touch screen 2B in an overlapping manner so as to be transmitted through the display screen (FIG. 18) according to the browser at Step S302.

Subsequently, the controller 10 determines whether the web browser has ended at Step S303. As a result of the determination, in a case where the web browser has not ended (No at Step S330), the determination of Step S303 is repeatedly performed. On the other hand, as a result of the determination, in a case where the web browser has ended (Yes at Step S303), the controller 10 displays only the screen (FIG. 8) of the program for a phone call that is in the middle of the execution on the display 2A of the touch screen 2B at Step S304, and the process returns to Step S301 described above.

On the other hand, in a case where the web browser is not to be executed at Step S301 (No at Step S301), the controller 10 continues to perform the screen display of the program for a phone call at Step S305, and the process returns to Step S301 described above.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the above-described embodiment, although a case has been described in which the screen used for notifying a user of the ongoing execution of the program for a phone call is displayed in an overlapping manner so as to be transmitted through another screen such as the home screen 40, any one of functions or applications built in the smartphone 1 may be arbitrary set by a user for the notice of the ongoing execution thereof to the user. FIG. 26 illustrates an example of a transparency setting screen. The user displays the transparency setting screen illustrated in FIG. 26 on the smartphone 1, for example, on the display 2A, and by selecting a check box of "On" for a processing function (program) for displaying another screen so as to be transmitted during the execution and selecting a check box of "Off" for a processing function (program) for not displaying another screen so as to be transmitted during the execution, the processing function for displaying another screen so as to be transmitted during the execution can be selected. In this way, the number of applications for the notification of the ongoing execution of the program may be freely changed.

For example, an application for which a user is notified of the ongoing execution may be an application which is charged by the time during which the application is executed. In other words, the application for which a user is notified of the ongoing execution may be an application that is charged higher as the time during which the application is executed becomes longer. In this way, the occurrence of charging can be perceived also during the execution of another application, whereby the function that is not necessary can be quickly ended. In addition, in the case where a charged application is set to the application for which a user is notified of the ongoing execution, a situation can be avoided in which a great amount of billing occurs to the user.

The target for which a user is notified of the ongoing execution may be set to a function that is executed by a program (or an application). For example, it may be configured such that the above-described control process (FIG. 22, 23, or the like) is performed in a case where the program for a phone call (or a phone call application) is executed and the phone call function is executed, and the above-described control process is not performed in a case where the program for a phone call is executed and the phone call function is not executed.

In the above-described embodiment, although a case has been described in which the screen (for example, see FIG. 9) used for notifying a user of the execution of the program for a phone call and another screen are displayed in an overlapping manner, the screen (for example, see FIG. 8) that is displayed during the execution of the program for a phone call and another screen may be displayed in an overlapping manner.

In the above-described embodiment, for example, as illustrated in FIG. 10, the image displayed on the screen illustrated in FIG. 9 and the image displayed on the home screen 40 illustrated in FIG. 6 are displayed on the display 2A of the touch screen 2B in an overlapping manner such that the screen illustrated in FIG. 9 is transmitted through the home screen 40 illustrated in FIG. 6. Thus, the home screen illustrated in FIG. 6 can be visually recognized through the screen illustrated in FIG. 9. However, for example, the screen illustrated in FIG. 9 may be configured to be transmitted through the home screen 40 illustrated in FIG. 6 by changing a degree of the transparency of the home screen, or the screen illustrated in FIG. 9 may be configured to transmit the home screen 40 illustrated in FIG. 6 therethrough by changing the a degree of transparency of the screen illustrated in FIG. 9. In a case where the screen illustrated in FIG. 9 is configured to transmit the home screen 40 illustrated in FIG. 6 therethrough, the image displayed on the screen illustrated in FIG. 9 is displayed on the image displayed on the home screen 40 in an overlapping manner. Alternatively, for example, the image (layer) displayed on the screen illustrated in FIG. 9 may be displayed in the image (layer) displayed on the home screen 40 illustrated in FIG. 6 in a simply overlapping manner without the screen being transmitted.

In the above-described embodiment, in a case where a predetermined operation is received by the smartphone 1, the application for which a notification of the ongoing execution thereof is made may be configured to be ended. For example, as illustrated in FIG. 10, in a case where the screen used for notifying a user of the ongoing execution of the program for a phone call is displayed in an overlapping manner so as to be transmitted through the home screen 40, when an operation of continuously pressing the button 3B for a predetermined time is received, or when an operation of pressing the button 3B a predetermined number of times within a predetermined time is received, the program for a phone call that is in the middle of execution may be ended.

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
a display;
a memory; and
a processor configured to
perform a multitasking function where a first application and a second application are executed in a parallel manner, and
cause the display to display, in a case where an execution screen of the second-application is to be displayed during execution of the first application, the execution screen of the second application and a notification screen on the display in an overlapping manner, the notification screen indicating that the first application is in the middle of execution,
wherein
the processor is further configured to, in accordance with a received operation, switch a screen to be displayed on the display from (i) a screen on which the notification screen of the first application and the execution screen of the second application overlap each other to (ii) an execution screen of the first application,
a type of the first application is different from a type of the second application,
the processor is further configured to
apply a predetermined color scheme to the notification screen, and
turn the notification screen on and off at a predetermined interval,
the processor is configured to cause the display to further display an information area and
a planar shape of the execution screen of the second application is equal to a planar shape combining a planar shape of the notification screen of the first application with a planar shape of the information area.

2. The device according to claim 1, wherein
the processor is configured to cause the display to display at least one of the notification screen of the first application and the execution screen of the second application such that one of the screens is visible through the other.

3. The device according to claim 1, wherein the execution screen of the second application is at least one screen of
a lock screen,
a home screen, and
an application screen that is a screen displayed on the display in a case where the second application is executed.

4. The device according to claim 1, wherein
the first application includes a phone call function, and
the processor is configured to cause the display to display, in a case where the execution screen of the second application is to be displayed during execution of a phone call, the execution screen of the second application and the notification screen indicating that the phone call is in the middle of execution in an overlapping manner.

5. The device according to claim 1, wherein
the processor is configured to end the first application that is in the middle of execution in a case where a predetermined operation is received.

6. The device according to claim 1, wherein the display includes a display device.

7. The device according to claim 1, wherein the first application is a program for a phone call, and the second application is a program for displaying a screen not related to the program for the phone call.

8. The device according to claim 1, wherein the processor is configured to, in accordance with the received operation while the device is in an unlocked state, switch the screen to be displayed on the display from (i) the screen on which the notification screen of the first application and the execution screen of the second application overlap each other to (ii) the execution screen of the first application.

9. A method of controlling a device that includes a display, the method comprising:
  performing a multitasking function where a first application and a second application are executed in a parallel manner;
  displaying, in a case where an execution screen of the second application is to be displayed during execution of the first application, the execution screen of the second application and a notification screen on the display in an overlapping manner, the notification screen indicating that the first application is in the middle of execution; and
    in accordance with a received operation, switching a screen to be displayed on the display from (i) a screen on which the notification screen of the first application and the execution screen of the second application overlap each other to (ii) an execution screen of the first application,
    wherein
    a type of the first application is different from a type of the second application,
    the notification screen is applied with a predetermined color scheme and is turned on and off at a predetermined interval,
  the method further comprises displaying an information area, and
    a planar shape of the execution screen of the second application is equal to a planar shape combining a planar shape of the notification screen of the first application with a planar shape of the information area.

10. A non-transitory storage medium that stores a program for causing, when executed by a device including a display, the device to execute:
  performing a multitasking function where a first application and a second application are executed in a parallel manner;
  displaying, in a case where an execution screen of the second application is to be displayed during execution of the first application, the execution screen of the second application and a notification screen on the display in an overlapping manner, the notification screen indicating that the first application is in the middle of execution; and
    in accordance with a received operation, switching a screen to be displayed on the display from (i) a screen on which the notification screen of the first application and the execution screen of the second application overlap each other to (ii) an execution screen of the first application,
    wherein
    a type of the first application is different from a type of the second application,
    the notification screen is applied with a predetermined color scheme and is turned on and off at a predetermined interval,
  the device is caused to further execute displaying an information area, and
    a planar shape of the execution screen of the second application is equal to a planar shape combining a planar shape of the notification screen of the first application with a planar shape of the information area.

11. A device, comprising:
  a display;
  a memory; and
  a processor for causing the display to display, in a case where an execution screen of a second function is to be displayed during execution of a first function, a first screen on which the execution screen of the second function and a notification screen overlap each other, the notification screen indicating that the first function is in the middle of execution,
  wherein,
  when the processor detects a downward sweep on the first screen and then detects the downward sweep stopped afterward,
    the processor is configured to switch a screen to be displayed on the display from (i) the first screen on which the notification screen of the first function and the execution screen of the second function overlap each other to (ii) an execution screen of the first function,
    a type of the first function is different from a type of the second function,
    the processor is further configured to
    apply a predetermined color scheme to the notification screen, and
    turn the notification screen on and off at a predetermined interval,
  the processor is configured to cause the display to further display an information area and
    a planar shape of the execution screen of the second function is equal to a planar shape combining a planar shape of the notification screen of the first function with a planar shape of the information area.

12. The device according to claim 11, wherein the display includes a display device.

13. The device according to claim 11, wherein the first function is a program for a phone call, and the second function is a program for displaying a screen not related to the program for the phone call.

14. A method of controlling a device that includes a display, the method comprising:
  determining whether a first function is in the middle of execution;
  in a case where an execution screen of a second function is to be displayed during execution of the first function,
    displaying on the display a first screen in which the execution screen of the second function and a notification screen overlap each other, the notification screen indicating that the first function is in the middle of execution; and
  when a downward sweep on the first screen is detected and then the downward sweep is detected as being stopped afterward,
    switching a screen to be displayed on the display from (i) the first screen on which the notification screen of the first function and the execution screen of the second function overlap each other to (ii) an execution screen of the first function,
    wherein
    a type of the first function is different from a type of the second function, the notification screen is applied with a predetermined color scheme and is turned on and off at a predetermined interval, the method further comprises displaying an information area, and a planar shape of the execution screen of the second function is equal to a planar shape combining a planar shape of the notification screen of the first function with a planar shape of the information area.

15. A non-transitory storage medium that stores a program for causing, when executed by a device including a display, the device to execute:

determining whether a first function is in the middle of execution;

in a case where an execution screen of a second function is to be displayed during execution of the first function, displaying on the display a first screen in which the execution screen of the second function and a notification screen overlap each other, the notification screen indicating that the first function is in the middle of execution; and when a downward sweep on the first screen is detected and then the downward sweep is detected as being stopped afterward, switching a screen to be displayed on the display from (i) the first screen on which the notification screen of the first function and the execution screen of the second function overlap each other to (ii) an execution screen of the first function, wherein a type of the first function is different from a type of the second function, the notification screen is applied with a predetermined color scheme and is turned on and off at a predetermined interval, the device is caused to further execute displaying an information area, and a planar shape of the execution screen of the second function is equal to a planar shape combining a planar shape of the notification screen of the first function with a planar shape of the information area.

16. A device, comprising:

a display;

a memory; and a processor for causing the display to display, in a case where an execution screen of a second function is to be displayed during execution of a first function, a first screen on which the execution screen of the second function and a notification screen overlap each other, the notification screen indicating that the first function is in the middle of execution, wherein, when the device is shaken a predetermined number of times, the processor is configured to switch a screen to be displayed on the display from (i) the first screen on which the notification screen of the first function and the execution screen of the second function overlap each other to (ii) an execution screen of the first function, a type of the first function is different from a type of the second function, the processor is further configured to apply a predetermined color scheme to the notification screen, and turn the notification screen on and off at a predetermined interval, the processor is configured to cause the display to further display an information area and a planar shape of the execution screen of the second function is equal to a planar shape combining a planar shape of the notification screen of the first function with a planar shape of the information area.

17. The device according to claim 16, wherein the display includes a display device.

18. The device according to claim 16, wherein the first function is a program for a phone call, and the second function is a program for displaying a screen not related to the program for the phone call.

19. A method of controlling a device that includes a display, the method comprising:

determining whether a first function is in the middle of execution;

in a case where an execution screen of a second function is to be displayed during execution of the first function, displaying on the display a first screen in which the execution screen of the second function and a notification screen overlap each other, the notification screen indicating that the first function is in the middle of execution; and when the device is shaken a predetermined number of times, switching a screen to be displayed on the display from (i) the first screen on which the notification screen of the first function and the execution screen of the second function overlap each other to (ii) an execution screen of the first function, wherein a type of the first function is different from a type of the second function, the notification screen is applied with a predetermined color scheme and is turned on and off at a predetermined interval, the method further comprises displaying an information area, and a planar shape of the execution screen of the second function is equal to a planar shape combining a planar shape of the notification screen of the first function with a planar shape of the information area.

20. A non-transitory storage medium that stores a program for causing, when executed by a device including a display, the device to execute:

determining whether a first function is in the middle of execution;

in a case where an execution screen of a second function is to be displayed during execution of the first function, displaying on the display a first screen in which the execution screen of the second function and a notification screen overlap each other, the notification screen indicating that the first function is in the middle of execution; and when the device is shaken a predetermined number of times, switching a screen to be displayed on the display from (i) the first screen on which the notification screen of the first function and the execution screen of the second function overlap each other to (ii) an execution screen of the first function, wherein a type of the first function is different from a type of the second function, the notification screen is applied with a predetermined color scheme and is turned on and off at a predetermined interval, the device is caused to further execute displaying an information area, and a planar shape of the execution screen of the second function is equal to a planar shape combining a planar shape of the notification screen of the first function with a planar shape of the information area.

* * * * *